(12) United States Patent
Abramson et al.

(10) Patent No.: US 8,731,167 B2
(45) Date of Patent: May 20, 2014

(54) SYSTEM AND METHOD OF PROVIDING A WALK-UP TELECOMMUNICATIONS TERMINAL HAVING A TELEPHONE APPLICATION AND INFORMATION APPLICATION

(75) Inventors: Sandra R. Abramson, Freehold, NJ (US); Yihsiu Chen, Middletown, NJ (US); Robert L. Mitchell, Aberdeen, NJ (US)

(73) Assignee: Avaya Inc., Basking Ridge, NJ (US)

( * ) Notice: Subject to any disclaimer, the term of this patent is extended or adjusted under 35 U.S.C. 154(b) by 2038 days.

(21) Appl. No.: 11/759,846

(22) Filed: Jun. 7, 2007

(65) Prior Publication Data

US 2007/0286381 A1    Dec. 13, 2007

(51) Int. Cl.
*H04M 1/64* (2006.01)
*H04M 11/00* (2006.01)
*H04M 15/00* (2006.01)
*H04M 1/56* (2006.01)
*H04M 17/00* (2006.01)
*H04M 3/42* (2006.01)

(52) U.S. Cl.
USPC ........... 379/201.04; 379/88.11; 379/88.13; 379/142.17; 379/144.08; 379/201.01

(58) Field of Classification Search
USPC ............ 379/67.1, 155, 211.01, 88.11, 88.13, 379/88.17, 142.17, 144.05, 144.08, 201.01, 379/201.04, 208.01; 455/414.1, 418, 145, 455/566
See application file for complete search history.

(56) References Cited

U.S. PATENT DOCUMENTS

| | | | | |
|---|---|---|---|---|
| 5,812,765 | A * | 9/1998 | Curtis | 709/200 |
| 6,118,860 | A * | 9/2000 | Hillson et al. | 379/155 |
| 6,141,684 | A * | 10/2000 | McDonald et al. | 709/222 |
| 6,574,325 | B1 * | 6/2003 | Baiyor et al. | 379/211.01 |
| 2001/0054019 | A1* | 12/2001 | de Fabrega | 705/35 |
| 2003/0144954 | A1* | 7/2003 | Quarles et al. | 705/40 |
| 2004/0023646 | A1* | 2/2004 | Inami et al. | 455/418 |
| 2004/0077340 | A1* | 4/2004 | Forsyth | 455/414.1 |
| 2007/0110035 | A1* | 5/2007 | Bennett | 370/352 |
| 2007/0192641 | A1* | 8/2007 | Nagendra et al. | 713/320 |
| 2007/0274466 | A1* | 11/2007 | Tidwell et al. | 379/67.1 |

* cited by examiner

*Primary Examiner* — Khai N Nguyen
(74) *Attorney, Agent, or Firm* — Muncy, Geissler, Olds & Lowe, P.C.

(57) ABSTRACT

A system and method are disclosed for providing access to a telephone Application and an Information Application using a walk-up telecommunications terminal having an intuitive, context-sensitive interface configured to facilitate simple and intuitive usage by a user. An Idle Application is displayed on a display screen of the walk-up telecommunications terminal. A Startup Screen is then displayed on the display screen of the walk-up telecommunications terminal in response to a triggering event. The Phone Application is activated in response to a Phone Application event. An Information Application is activated in response to an Information Application event. The Phone Application is configured to take priority over the Information Application in the user interaction with the walk-up telecommunications terminal.

40 Claims, 26 Drawing Sheets

100

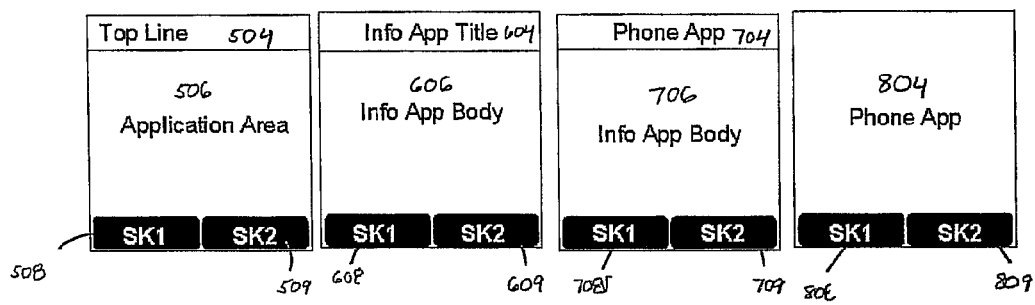
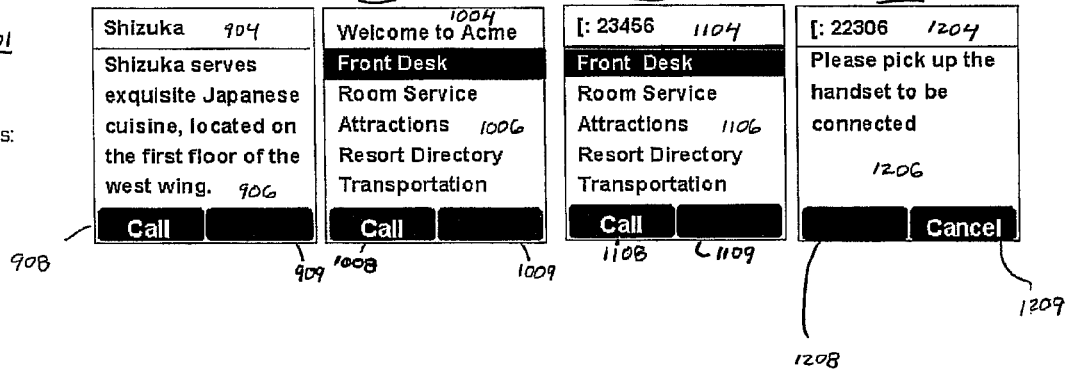

| Flow | Sub | Content |
|---|---|---|
| 1000 | | Basic Call (idle, off-hook dialing) |
| | 1100 | Off-hook calling from a Call Item |
| | 1300 | Digits Collection in Phone Application |
| | 1400 | Holding a call |
| | 1410 | On-hook navigation when PA is active |
| | 1420 | Off-hook navigation |
| | 1430 | On-hook resume |
| 2000 | | On-hook Navigation and calling |
| | 2100 | On-hook dialing with digits |
| | 2500 | On-hook switch to a Contact List application |
| 3000 | | On-hook navigation when PA is not active |
| 4000 | | Two calls actions |
| | 4100 | One active call + place a new call through dialing |
| | 4150 | One active call + place a new call through Call item |
| | 4160 | One active call + place a second call through Call item |
| | 4200 | One active call + Incoming call |
| | 4300 | Switch between two calls |
| | 4400 | When both calls are on hold |

[ Active Call
B Bell icon for incoming call

FIG. 15

F1000 Basic Call

| Flow | User Does/Event | User expects system to | User gets / System will |
|---|---|---|---|
| .0 | Nothing (for a period of time that exceeds the idle threshold) | Present Idle Application | Idle Screen<br><br>Acme Resort<br>Welcome<br>[Start] [Help]<br>On-hook |
| .1 | Off-hook<br><br>Alt:<br>a. Incoming call (F1200)<br>b. [Start] SK (F2000 on-hook navigation)<br>c. [Start] HK (F2000 on-hook navigation)<br>d. Navigation keys (F2000 on-hook navigation)<br>e. Start entering digits (on-hook dialing F2100)<br>f. [Help] SK *<br>g. [Contacts] HK (F2500) | Present dial tone<br>Displays Main Menu | When phone is off-hook, the Top line prompts for dialing or select.<br>PA is triggered.<br>Main menu is available for selection<br><br>[: Dial or select:<br>Front Desk<br>Room Service<br>Attractions<br>Directory<br>Transportation<br>[Call]<br>Off-hook |
| .2 | Enter digits (example 22306)<br><br>Alt:<br>a. Incoming call (F1250)<br>b. [Down] HK to select a Call Item (F1100)<br>c. [Down] HK to select a Connector Item (PA active with dial tone, F1420) | Echo digits on the screen | Removes "Dial or select" and echoes the digits on screen<br><br>[: 22306<br>Front Desk<br>Room Service<br>Attractions<br>Directory<br>Transportation<br>[Call]<br>Off-hook |

FIG. 16A

| .3 | Complete dialing and Call is connected<br><br>Alt:<br>a. [Down] HK to select other choices before a "callable" number is complete (F1300)<br>b. On-hook *** | Show that there is now an active call | PA shows the active call on the screen. When there is an active call, [Call] SK to place another call is disabled.<br><br>Off-hook |
|---|---|---|---|
| .4 | On-hook<br><br>a. [Down] HK to a Connector Item. ****<br>b. [Down] HK to a Call item. (F4160) | Terminate the call | Terminates the call telecommunications terminal is on-hook<br>Top Line is yielded to the current application (i.e., Main Menu) (F2000)<br>On-hook |

FIG. 16B

| | | | |
|---|---|---|---|
| * | From this.1, [Help] SK | See Help Content on how to use telecommunications terminal. | Displays Help content. The actual content will be defined, but can be modified by customer. |
| ** | From this.3, [Cancel] SK | Cancel the call attempt but may still want to place a call | When phone is off-hook, [Cancel] SK is equivalent of a Drop. Present dial tone The digits already dialed are cleared. The prompt returns See this.1 <br> Off-hook |
| *** | From this.3, On-hook | Cancel the call attempt; user may not want to place a call any more. (Going on-hook and quickly off-hook can also be a way to "reset" the phone.) | When phone is off-hook, [Cancel] SK is equivalent of a Drop. Present dial tone The digits already dialed are cleared. The prompt returns See this.1 <br> On-hook |
| **** | From this.4, [Down] HK to a Connector Item. | Highlight moves accordingly. [Select] SK is expected. | As PA is active but there is no dial tone, the flow follows the example of F1410. SKs change according to highlight. |

FIG. 16C

F1100 Off-hook Calling from Call Item

| Flow | User Does/Event | User expects system to | User gets / System will |
|---|---|---|---|
| .1 | From 1000.2, [Down] HK to select a Call Item | Change highlight according to scrolling; As an example, the user scrolls to "Room Service" | Moves highlights to "Room Services." As it is a Call item, SK1 changes to [Call]  Off-hook |
| .2 | [Call] SK  Alt: a. Start entering digits *  b. [Contacts] HK ** | Places a call to Room Service. | Places the call to Room Service, Shows that a call has been placed. (Follow example in F1000.3) Off-hook |
|  |  |  |  |
| * | From this.2, Start entering digits | Telecommunications terminal starts recording digits and echoing them on screen | Highlight returns to PA. See F1000.2 as example of off-hook dialing See F1300 as example of digit collection and scrolling interaction. Off-hook |
| ** | From this.2, [Contacts] HK | Switch to list application | PA remains active. The Top Line remains unchanged. Current IA switches to List Application Off-hook |

FIG. 17

F1300 Digit Collection in Phone Application

| Flow | User Does/Event | User expects system to | User gets / System will |
|---|---|---|---|
| .1 | From 1000.3, Start entering digits, and the phone is already off-hook | See digits being recording and echoed; assume the target number is 800-555-1234 | As the phone is already off-hook, PA is active. Echoes the digits on the Top Line 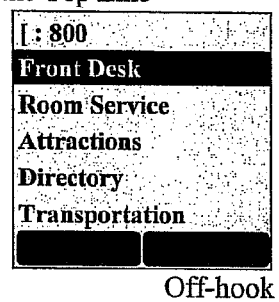 Off-hook |
| .2 | [5] [5] [5]<br><br>Alt:<br>a. [Call] SK ***<br>b. [Cancel] SK*<br>c. Incoming call (F1250) | Phone continues to collect digits | Phone App continues to collect and echo digits.  Off-hook |
| .4 | [Down] SK to scroll to another item<br><br>Alt:<br><br>a. [Cancel] SK*<br>b. Incoming call (F1250) | Changes the highlight according to scrolling | The highlight moves down, and the Softkey menu changes accordingly 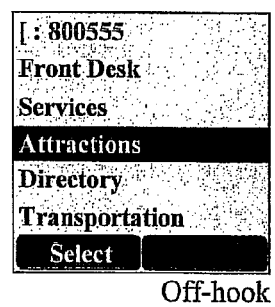 Off-hook |

FIG. 18A

| | | | |
|---|---|---|---|
| .5 | [1] [2] [3] [4]<br>Alt:<br>a. [Select] SK ****<br>b. [Cancel] SK *<br>c. Incoming call (F1250) | Phone continues to collect digits | Phone App continues to collect and echo digits<br><br>Off-hook |
| .6 | Call is connected | The call is placed to the number entered on the screen. | A call is placed.<br>Show that there is an active call<br>(Follow example in F1000.3)<br>Off-hook |
| | | | |
| * | From this.*,<br>[Cancel] SK | Cancel the call action | Phone is still off-hook<br>Digits are discarded<br>Presents off-hook screen with current IA<br>(Follow example in F1000.1)<br>Off-hook |
| ** | From this.*,<br>On-hook | Either user is done or user wants to reset the screen | PA disappears.<br>Current IA is still on screen.<br>Highlight stays where it is.<br>(Follow example in F2000)<br>On-hook |
| *** | From this.3,<br>[Call] SK | Places a call to the selected call item | PA places the call.<br>Digits are discarded.<br>Current IA remains.<br>Off-hook |
| **** | From this.5,<br>[Select] SK | Display another screen accordingly. | PA remains active.<br>Current IA changes accordingly<br>Off-hook |

FIG. 18B

F1420 Off-hook navigation (Phone Application is active), with dial tone

Compare with F1410, On-hook navigation when PA is active, but there's no dial tone

| Flow | User Does/Event | User expects system to | User gets / System will |
|---|---|---|---|
| .1 | From F1000.3, [Down] HK to scroll to a Connector Item (when telecommunications terminal is off-hook, there is a dial tone) | Highlight moves accordingly. (The flow assumes there is no call) Dial tone continues | Moves the highlight downward according to scrolling action. PA state remains unchanged.<br>[ : Dial or select:<br>Front Desk<br>Room Services<br>Attractions<br>Directory<br>Transportation<br>Select<br>Off-hook |
| .2 | [Select] SK<br><br>Alt:<br>  a. On-hook *<br>  b. Enter digits  | The screen changes to display next menu.<br>Dial tone continues | The connector item is activated to go to next menu. PA remains unchanged.<br>SK changes to reflect options.<br>[ : Dial or select:<br>Restaurants**<br>Fitness Center<br>Conference Center<br>Spa<br>Room Services  (v)<br>Select  Back<br>Off-hook |
| .4 | [Select] SK<br><br>Alt:<br>a. On-hook *<br>b. Enter digits **<br>c. [Back] SK *** | The screen changes to display next menu.<br>Dial tone continues | As PA is active, highlight goes to Top Line.<br>Current IA changes accordingly.<br>[ : Dial or select:<br>Le Monde<br>Shizuka<br>Crescent Horns<br>Purple Moon<br>Yellow Submarine<br>Select  Back<br>Off-hook |

FIG. 19A

| .5 | [Down] HK to scroll to a Connector Item.<br><br>Alt:<br>a. On-hook *<br>b. Enter digits  | Highlight moves accordingly,<br>Dial tone continues | As PA is active, highlight goes to Top Line.<br>Current IA changes accordingly.<br>[ : Dial or select:<br>Le Monde<br>Shizuka**<br>Crescent Horns<br>Purple Moon<br>Yellow Submarine<br>Select  Back<br>Off-hook |
| --- | --- | --- | --- |
| .6 | [Select] SK<br><br>Alt:<br>a. Off-hook *<br>b. Enter digits **<br>c. [Back] SK *** | See the next page or menu.<br>Dial tone continues | Current IA changes accordingly.<br>As PA is active, and there is a dial tone the highlight goes to Top Line.<br>[Call] SK is provided.<br>[ : Dial or select:<br>Shizuka serves exquisite Japanese cuisine, located on the first floor of the west wing.<br>Call  Back<br>Off-hook |
|  | [Call] SK | A call is placed to the embedded Call item | Follow example of F1000.3, an active call.<br>IA screen remains. |
|  |  |  |  |
| * | From this.*,<br>On-hook | User just hangs up the phone | PA disappears, as user goes on-hook and there is no call.<br>On-hook |
| ** | From this.*,<br>Enter digits | Digits are collected and echoed. | See F1300 for example of moving between PA and IA.<br>Off-hook |
| *** | From this.*,<br>[Back] SK | Shows previous screen | PA state remains unchanged.<br>IA displays previous screen.<br>Off-hook |

FIG. 19B

F2000 On Calling from Call Item

| Flow | User Does/Event | User expects system to | User gets / System will |
|---|---|---|---|
| .1 | From 1000.1, user presses the [Start] HK or SK, or a navigation key<br><br>(This example also applies to whenever user presses the [Start] HK. The actual flow needs to On/Off-hook state into account.) | Displays a menu | Main Menu. The first item of the current application is highlighted<br><br>Welcome to Acme<br>Front Desk<br>Room Service<br>Attractions<br>Directory<br>Transportation<br>Call<br>On-hook |
| .2 | [Call] SK<br><br>Alt:<br>a. Off-hook *<br>b. Start entering digits (editable, en bloc dialing, F2100)<br>c. [Down] HK to select a Call Item <br>d. [Down] HK to select a Connector Item (F3000)<br>e. Incoming Call (F1200) | System is about to place a call. | As telecommunications terminal is on-hook, Ring telecommunications terminal PA prompts user to go off-hook.<br><br>[ : Front Desk<br>Please pick up the handset to be connected.<br><br>Cancel**<br>On-hook |
| .3 | Off-hook and call is connected<br><br>Alt:<br>a [Cancel] SK *** | User expect to talk to Front Desk | Displays an active call to Front Desk<br>(Follow example in 1000.3)<br>Off-hook |

FIG. 20A

|   |   |   |   |
|---|---|---|---|
| * | From this.2,<br>Off-hook | User expects to hear dial tone and a chance to place a call.<br>(It cannot be assumed that the user wants to place a call to the highlighted Call item. User can lift the handset to dial a number. What is highlighted may not be a call item, either.) | Presents dial tone and off-hook screen. (F1000.1)<br>Off-hook |
| ** | From this.2,<br>[Down] HK to select a Call Item | Highlight a different menu item | Move the highlight down to the next item of the menu.<br>On-hook |
| *** | From this.3,<br>[Cancel] SK | Cancels the call action | Returns to this.1.<br>On-hook |

FIG. 20B

F2500 An example of Contacts as a List application

| Flow | User Does/Event | User expects system to | User gets / System will |
|---|---|---|---|
| .1 | From 1000.1, or any other context, [Contacts] HK<br><br>(This example also applies to whenever user presses the [Contacts] HK. The actual flow needs to On/Off-hook state into account.) | Presents a different menu that is 'list like'. | Switch the current application to List application (Contacts, as an example)<br>The first Call item is highlighted<br><br>Contacts<br>Apple, Adam<br>Bezzo, Bill<br>Chase, Charles<br>Duncan, David<br>Epstein, Ed (v)<br>Call   Back<br>On-hook |
| .2 | [Call] SK<br><br>Alt:<br>a. Off-hook *<br>b. Start entering digits (editable, en bloc dialing, F2100)<br>c. [Down] HK to select a Call Item ** | System is about to place a call. | As telecommunications terminal is on-hook,<br>Ring telecommunications terminal<br>PA prompts user to go off-hook.<br><br>[: Apple, Adam<br>Please pick up the handset to be connected.<br>Cancel<br>On-hook |
| .3 | Off-hook and call is connected<br><br>Alt:<br>a. [Cancel] SK *** | User expect to talk to Front Desk | Displays an active call to Front Desk<br>(Follow example in 1000.3)<br>Off-hook |

FIG. 21A

| | | | |
|---|---|---|---|
| * | From this.2, Off-hook | User expects to hear dial tone and a chance to place a call. (It cannot be assumed that the user wants to place a call to the highlighted Call item. User can lift the handset to dial a number. What is highlighted may not be a call item, either.) | Presents dial tone and off-hook screen. (F1000.1)<br>Off-hook |
| ** | From this.2, [Down] HK to select a Call Item | Highlight a different menu item | Move the highlight down to the next item of the menu.<br>On-hook |
| *** | From this.3, [Cancel] SK | Cancels the call action | Returns to this.1.<br>On-hook |

FIG. 21B

F3000 On-hook Navigation with Connector Items when PA is not active
Compare with F1410, On-hook navigation when PA is active.

| Flow | User Does/Event | User expects system to | User gets / System will |
|---|---|---|---|
| .1 | From 2000.2, [Down] HK to select a Connector Item | See highlight changes according to scrolling. Assume that "Attractions" is the target. See highlight scrolls down to the target item. | Main Menu (with prompt) The first item of the Main Menu application is highlighted <br><br> Welcome to Acme <br> Front Desk <br> Room Services <br> Attractions <br> Directory <br> Transportation <br> Select <br> On-hook |
| .2 | [Select] SK <br><br> Alt: <br> a. Off-hook * <br> b. Enter digits  | The screen changes to display next menu. | According to Connector Item convention, displays "Attractions" as the prompt for the "Attractions" menu. The first item is automatically highlighted. <br><br> Attractions <br> Restaurants** <br> Fitness Center <br> Conference Center <br> Spa <br> Room Services (v) <br> Select  Back <br> On-hook |
|  |  |  | As PA is active, highlight goes to Top Line. Current IA changes accordingly. <br><br> Restaurants <br> Le Monde <br> Shizuka <br> Crescent Horns <br> Purple Moon <br> Yellow Submarine <br> Select  Back <br> Off-hook |

FIG. 22A

| .3 | [Select] SK<br><br>Alt:<br>a. [Back] SK ***<br>b. Off-hook *<br>c. Enter digits ** | The screen changes to display next menu. | As PA is active, highlight goes to Top Line.<br>Current IA changes accordingly.<br>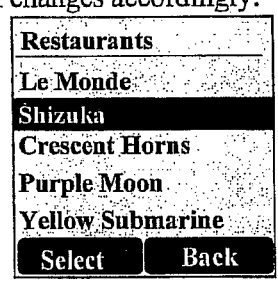<br>Off-hook |
|---|---|---|---|

(v) is the "There's more to the list" indicator described in

| .4 | [Select] SK<br><br>Alt:<br>a.[Back] SK ***<br>b.Off-hook *<br>c.Enter digits ** | See the next page or menu. | Displays content page of Shizuka. As this content page has an inherent Call Item, a [Call] softkey is provided.<br>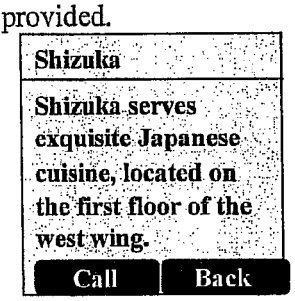<br>On-hook |
|---|---|---|---|
| .5 | [Call] SK<br><br>Alt:<br>a.[Back] SK ***<br>b.Off-hook ****<br>c.Enter digits ** | Expects to Call Shizuka | As telecommunications terminal is still on-hook, the Phone app prompts the user to pick up the handset. See F2000.2<br>On-hook |

FIG. 22B

| | | | |
|---|---|---|---|
| * | From this.2, this.3, this.4<br>Off-hook | User expects to hear dial tone and a chance to place a call. | Presents dial tone and trigger Phone App.<br>Show off-hook screen but maintain the current IA screen (F1000. 1)<br>Off-hook |
| ** | From this.*,<br>Enter digits | User expects the digits to be collected and echoed on screen. | PA becomes active and takes over the Top Line, as in F2100.1.<br>Current IA remains.<br>On-hook |
| *** | From this.*,<br>[Back] SK | Expects system to switch to previous screen. | Presents the previous screen.<br>On-hook |
| ** | From this.5,<br>Off-hook | User wants to place a call. User expects dial tone. | [: Dial or Select<br>Shizuka serves exquisite Japanese cuisine, located on the first floor of the west wing.**<br>Call    Back<br>On-hook |

FIG. 22C

CM Directory Example

| Flow | User Does/Event | User expects system to | User gets / System will |
|---|---|---|---|
| .1 | Scrolls to a Connector Item that triggers CM directory. | Sees highlight moves to the Connector Item. Expects [Select] SK | Moves highlight accordingly. SKs change accordingly  |
| .2 | [Select] SK | Expects to see Directory application<br><br>Lincroft CM directory data are used in this example. Compare flow with 4620 interaction. | Triggers CM Directory application and prompting for first letter. 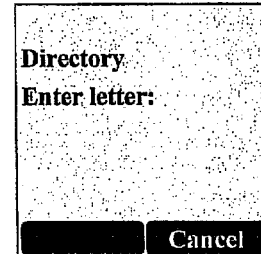 |
| .3 | [3]<br><br>(Assume target in user's mind is "Farber")<br><br>Alt:<br>  a. [Cancel] SK<br>  b. No match in system | Expects to see input echoed on screen.<br>Most users would expect determinant entry, so "D" is likely the expected result. | Sends key stroke to CM and displays CM response, with new prompt and first letter highlighted. 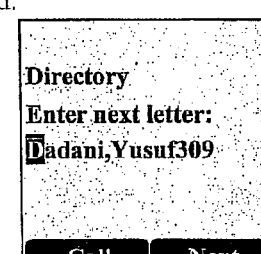 |

FIG. 23A

| | | | |
|---|---|---|---|
| .4 | [2]<br><br>Alt:<br>  c.  [Call] SK (this.7)<br>  d.  [Next] SK *<br>  e.  No match in system | Expects to see the reaction of another entry.<br><br>User may have notice the highlight letters increase as the result of key presses. | Sends key stroke to CM and displays CM response, with new prompt and first two letters highlighted.<br> |
| .5 | [7]<br><br>Alt:<br>  a.  [Call] SK (this.7)<br>  b.  [Next] SK * | Expects to see the reaction of another entry.<br><br>User may have notice the highlight letters increase as the result of key presses. | Sends key stroke to CM and displays CM response, with new prompt and first three letters highlighted.<br>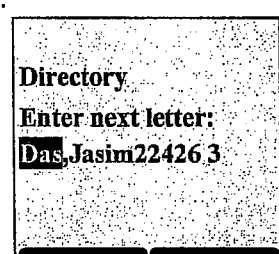 |
| .6 | [2]<br><br>Alt:<br>  a.  [Call] SK (this.7)<br>  b.  [Next] SK *<br>  c.  [6] ** | Expects to see the reaction of another entry.<br><br>User may have notice the highlight letters increase as the result of key presses. | Sends key stroke to CM and displays CM response, with new prompt and first four letters highlighted.<br>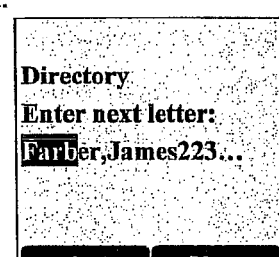 |
| .7 | [Call] | | PA places a call to the extension currently shown. If the phone is on-hook, PA displays the prompt for user to go off-hook.<br>Special for CM Directory: screen returns to prior to When CM application was activated. |

FIG. 23B

| | | | |
|---|---|---|---|
| * | From this.*;<br>[Next] SK | | Sends [Next] feature key to CM and displays CM response, with new prompt and first three letters highlighted. ([Next] does not increase letter count) |
| ** | From this.6,<br>[6] | | This causes an error as CM cannot find a match. An error prompt is displayed with two new SKs.<br>[Restart] SK goes to this.2<br>[Cancel] SK returns to this.1  |

SYSTEM AND METHOD OF PROVIDING A WALK-UP TELECOMMUNICATIONS TERMINAL HAVING A TELEPHONE APPLICATION AND INFORMATION APPLICATION

CLAIM OF PRIORITY UNDER 35 U.S.C. §119

The present Application for Patent claims priority to Provisional Application No. 60/811,416 entitled "WALK UP PHONE" filed Jun. 7, 2006, and assigned to the assignee hereof and hereby expressly incorporated by reference herein.

FIELD OF DISCLOSURE

The present invention relates to a system and method of providing a telecommunications terminal in general, and more particularly, to a system and method of providing a walk-up telecommunications terminal having an intuitive user interface that is simple and easy to use and that is configured to provide a Phone Application (PA) and an Information Application (IA).

BACKGROUND

Conventionally, telephones or information terminals have been provided for use by visitors, customers, building employees, etc. in common areas or shared spaces of a customer's location, such as a building or hotel lobby, hospital entrance, corporate conference room, reception area, waiting area, printer or copier room, breakroom, hallway, etc. Some conventional telephone terminals can provide limited (e.g., local) telephone service. Additionally, some conventional information terminals can provide informational content to users.

However, the conventional information terminals are not easily used and can be difficult to understand by users that are not familiar with the operation of the telephone or information terminal.

SUMMARY

There exists a need in the art for a telecommunications terminal that is easy to use and understand by users, such as visitors, customers, building employees, etc. in common areas or shared spaces of a customer's location, such as a building or hotel lobby, hospital entrance, corporate conference room, reception area, waiting area, printer or copier room, breakroom, hallway, etc., and that provides telephony tasks and information tasks. For example, there is a need for a telecommunications terminal that is simple and intuitive in order to keep the experience simple and easy for walk-up users. There also is a need for a smart telephony and information endpoint which can be located in the shared space of a customer's location.

Accordingly, the exemplary embodiments described herein can provide a telecommunications terminal having a simple and intuitive user interface that is configured to make respective communications functions easier and faster to accomplish, without prior knowledge of the operation of the system by the user. The exemplary embodiments can be configured to make users proficient and confident in performing common telephony tasks and informational tasks.

Exemplary embodiments of the invention are directed to systems and method for providing access to a telephone Application and an Information Application using a walk-up telecommunications terminal having an intuitive, context-sensitive interface configured to facilitate simple and intuitive usage by a user. The embodiment can include displaying an Idle Application on a display screen of the walk-up telecommunications terminal, displaying a Startup Screen on the display screen of the walk-up telecommunications terminal in response to a triggering event, activating the Phone Application in response to a Phone Application event, and activating the Information Application in response to an Information Application event. The Phone Application can be configured to take priority over the Information Application in the user interaction with the walk-up telecommunications terminal.

Another embodiment can include at least one of the Phone Application and the Information Application being configured to facilitate use by the user without prior familiarity with each application.

In another embodiment, the Phone Application can be configured to provide telephony functions of the walk-up telecommunications terminal. The Phone Application can be configured to receive and/or send at least one telephone call. The Phone Application may be configured to handle one call at a time such that when a call is in progress an additional call cannot be received or placed.

In one embodiment, the Phone Application is active when a call activity exists and/or when a handset of the walk-up telecommunications terminal is off-hook. The Phone Application may be configured to take priority over a top line of the display screen when there is a call being placed or received. The Phone Application may be configured to use the top line of the display when the Phone Application is active.

In one embodiment, the Information Application may include an application other than the Phone Application. The Information Application can include, for example, one or more of a web browser, a local application, and a wireless markup language (WML) application. The local application can include at least one of a main menu and a Contacts application.

According to an exemplary embodiment, when the Phone Application is active, the Phone Application and the Information Application can be configured to display information on the display screen at a same time. The Information Application may be configured to display information in the application area of the display screen when the Phone Application is active, and the Information Application may be configured to display information on the top line and the application area of the display screen when the Phone Application is not active. In other embodiments, when the Phone Application is not active, the Information Application may be configured to display, in the top line of the display of the walk-up telecommunications terminal, prompts for prompting the user to perform a predetermined action. In still other embodiments, when the Phone Application is not active, the Information Application may be configured to display a title of an active application in a top line of the display screen and a content page of the Information Application in the application area.

An embodiment also includes activating the Phone Application and initiating a telephone call in response to the user selecting a call item being displayed by the Information Application. In another embodiment, when the telephone call is placed in response to the selection of the call item, the Phone Application may display a label of the call item on a top line of the display screen. In another embodiment, the Phone Application may be configured to display a prompting message on the display screen for prompting the user to pick Lip a handset of the walk-Lip telecommunications terminal to be connected to an incoming telephone call. The Phone Application may display the prompting message in the top line of the display screen, or in other locations on the screen.

In one embodiment, the Idle Application may be displayed on the display screen of the walk-up telecommunications terminal when an idle time exceeds an idle threshold. The idle time may be, for example, a time that the Phone Application and the Information Application are inactive. In other embodiments, an idle splash screen may be displayed as a default Idle Application. The idle splash screen may include, for example, a wireless markup language based (WML-based) application and/or a branded Splash screen.

In an embodiment, the triggering event of the Start Application may include at least one of an action of the user taking a handset of the walk-up telecommunications terminal off the hook, the user pressing a key of the walk-up telecommunications terminal, an incoming call, and a barge-in or HTTP push. A navigation path of the Information Application may be reset when the Start Application is activated. The Start Application may display a main menu, a Contacts application, a Directory application, and/or a browser application. In one embodiment, when the Start Application displays the main menu and when the main menu includes only one item, the walk-up communications terminal automatically launches the one item. The main menu may include a connector item that links to the Contacts application, the Directory application, and/or the browser application.

In an embodiment, the Phone Application can display a prompt in the application area for requesting the user to pick up the handset when the communications terminal is on the hook and the user attempts to engage in an action that requires the phone to be off-hook. When the communications terminal is taken off the hook by the user, the action can be engaged and the application area can be returned to a previously displayed application.

In an embodiment, the Phone Application can display an error message to inform the user that a call is already in progress, and an attempt to launch another call can be prevented.

In an embodiment, the configuration and settings options of the walk-up telecommunications terminal can be configured such that the configurations and settings options are not visible in the Phone Application and the Information Application and are triggered by a predetermined key sequence known by a system administrator.

Another embodiment includes a computer-readable medium having computer-executable instructions contained therein for a method of providing access to a telephone Application and an Information Application using a walk-up telecommunications terminal having an intuitive, context-sensitive interface configured to facilitate simple and intuitive usage by a user.

Yet another embodiment includes a method of providing information to a user of a walk-up telecommunications terminal and allowing the user to place a call to an intended destination. The exemplary method can include displaying an Idle Application on a display screen of the walk-up telecommunications terminal when an idle time exceeds an idle threshold, displaying a Startup Screen on the display screen of the walk-up telecommunications terminal in response to a triggering event, activating a Phone Application in response to a Phone Application event, and activating an Information Application in response to an Information Application event. The idle time can be defined, for example, as a time that the Phone Application and the Information Application are inactive. The triggering event can include, for example, a key of the walk-up telecommunications terminal being pressed, a handset of the walk-up telecommunications terminal being taken off-hook, an incoming call, and/or a barge-in or HTTP push. The Phone Application can be configured to take priority over the Information Application in the user interaction with the walk-up telecommunications terminal.

In one embodiment, the triggering event can include an incoming call and the embodiment can display a prompting message on the display screen for prompting the user to pick up a handset of the walk-up telecommunications terminal to be connected to the incoming call.

In another embodiment, when the triggering event includes the handset of the walk-up telecommunications terminal being taken off-hook, the method can include activating the Phone Application and initiating a telephone call in response to the user entering a phone number or selecting a call item being displayed by the Information Application.

In another embodiment, when the user enters a phone number or selects a call item being displayed by the Information Application and the handset of the walk-up telecommunications terminal is on-hook, the method can include displaying a prompting message on the display screen for prompting the user to pick up a handset of the walk-up telecommunications terminal to initiate the outgoing call.

In an embodiment, when the Phone Application is active, the Phone Application and the Information Application can be configured to display information on the display screen at a same time.

One or more of the foregoing aspects may provide one or more of the following advantages.

For example, the exemplary embodiments can provide an intuitive, simple, and easy to use telecommunications terminals for use by visitors, customers, building employees, etc. in common areas or shared spaces of a customer's location, such as building or hotel lobbies, hospital entrances, corporate conference rooms, reception areas, waiting areas, printer or copier rooms, break-rooms, hallways, etc. Customers and visitors are examples of "walk-up" users. For example, a walk-up user can be a person needing simple access to information, such as a building Directory, and/or the ability to place calls from a telephone placed in a common area such as the lobby of a headquarters building, etc. The exemplary embodiments can enable such walk-up users to easily perform telephony tasks and/or informational tasks without prior knowledge of the telecommunications terminal.

The exemplary embodiments may not be affiliated with a specific user identity or a single end user, and/or may not be configured to be customized by an individual user. Instead, the exemplary embodiments can be configured for brief interaction between the user and the telecommunications terminal for performing, for example, a simple telephony or information task. Such telecommunications terminals can be shared by a plurality of visitors, building employees, etc. Accordingly, the embodiments can provide easy access to features that can be helpful for building visitors, and the features of the exemplary user interface can be configured for use in common areas, instead of for an individual user.

An embodiment also can be configured to provide support for telephone calls, for example, a single call appearance. Thus, the exemplary embodiments can provide a streamlined telecommunications terminal that provides a backlit display along with support for Web based menus and directories configured to make it simple for the walk-up user to easily access information such as performing a lookup and/or to place a call using the telecommunications terminal. The embodiments also can provide enhanced and improved productivity of users, for example, through prompting for common telephony tasks, one-touch access to key features, and superior high fidelity audio.

The embodiments can provide an intuitive user interface. For example, one embodiment can provide an intuitive, context-sensitive interface configured to facilitate simple and intuitive usage by featuring context-driven menus with on-screen prompts, which can enable straightforward access to, for example, a welcome menu and contact Directory. Accordingly, the embodiments can be simple and easy to use by building Visitors and other users in common areas.

For example, one exemplary embodiment can provide a large, backlit display and integrated Web browser that are configured to provide intuitive access to simple applications or productivity enhancing Phone Applications, such as access to building directories, visitor information, news, events, etc. To further improve the ease of usability of the telecommunications terminal, other embodiments can include a display that is significantly larger than is conventionally found in a lobby phone. The embodiments also can provide, for example, a four-way navigation button cluster as part of the user interface for navigation and feature selections for the everyday user. These embodiments are capable of facilitating better usage of the display and the built-in browser to improve access to information and use of telephone features. The exemplary embodiments also can provide a user interface having a simplified and intuitive configuration of buttons and features that are effective for keeping the experience of operating the telecommunications terminal simple and easy for walk-up users. Other embodiments can be configured to utilize open standards and to provide a modular platform that supports a wide range of modules and adapters, thereby further enhancing user productivity.

Accordingly, the combination of the Information Application and the ability to host Phone Applications, can provide a user with a helpful portal of information that is easy to use and understand, which are features that are desirable for telecommunications terminals for use in common areas.

BRIEF DESCRIPTION OF THE DRAWINGS

The accompanying drawings are presented to aid in the description of embodiments of the invention and are provided solely for illustration of the embodiments and not limitation thereof.

FIGS. 5 through 12 depict embodiments of display modes of user interface of a telecommunications terminal.

FIG. 15 depicts a table of exemplary flow diagrams and sub-flow diagrams, as illustrated in FIGS. 16A-23C.

FIGS. 16A, 16B, and 16C depict an embodiment of a basis call flow diagram of a telecommunications terminal.

FIG. 17 depicts an embodiment of a flow diagram for off-hook calling from a call item of a telecommunications terminal.

FIGS. 18A and 18B depict an embodiment of a flow diagram for digit collection in a Phone Application of a telecommunications terminal.

FIGS. 19A and 19B depict an embodiment of a flow diagram for off-hook navigation of a telecommunications terminal.

FIGS. 20A and 20B depict an embodiment of a flow diagram for calling from a call item of a telecommunications terminal.

FIGS. 21A and 21B depict an embodiment of a flow diagram for Contacts as a List Application of a telecommunications terminal.

FIGS. 22A, 22B, and 22C depict an embodiment of a flow diagram for on-hook navigation of a telecommunications terminal.

FIGS. 23A, 23B, and 23C depict an embodiment of a flow diagram for a Communication Manager (CM) Directory of a telecommunications terminal.

DETAILED DESCRIPTION

Aspects of the embodiments of the invention are disclosed in the following description and related drawings directed to specific embodiments of the invention. Alternate embodiments may be devised without departing from the scope of the invention. Additionally, well-known elements of the embodiments will not be described in detail or will be omitted so as not to obscure the relevant details of the embodiments.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

As described above, there is a need for intuitive, simple, and easy to use telecommunications terminals for use by visitors, customers, building employees, etc. in common areas or shared spaces of a customer's location, such as building or hotel lobbies, hospital entrances, corporate conference rooms, reception areas, waiting areas, printer or copier rooms, break-rooms, hallways, etc. The exemplary embodiments described below can provide telephone services and/or informational content to users in a simple and easy to use manner. The exemplary embodiments can be configured to be simple and intuitive in order to keep the experience simple and easy for walk-up users.

Thus, the exemplary embodiments can provide a smart telephony and information endpoint located in the shared space of a customer's location. Exemplary embodiments will be described below with reference to FIGS. 1 through 23C.

Figure 1:
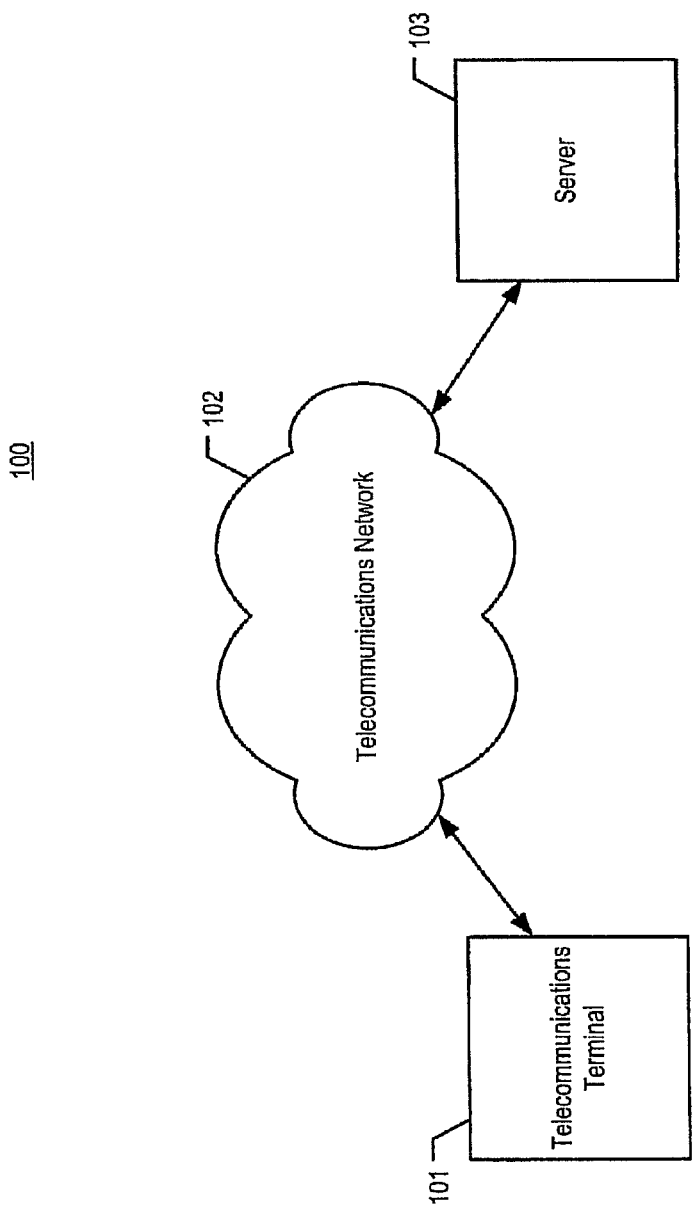
FIG. 1 depicts a telecommunications system 100, in accordance with an illustrative embodiment of the present invention.

FIG. 1 depicts a telecommunications system 100, in accordance with an illustrative embodiment. The telecommunications system 100 can comprise, for example, a telecommunications terminal 101, a telecommunications network 102, and a server 103, which can be interconnected as exemplarily shown.

The telecommunications terminal 101 can be a client machine that is capable of transmitting and receiving packets of data via the telecommunications network 102, in a well-known fashion. For example, a user of the terminal 101 can request information, whereupon the terminal 101 can transmit the request to a content server, such as a server 103, and can subsequently receive the requested information. The terminal 101 also can be capable of performing the tasks described below and with respect to FIGS. 14 through 23B, in accordance with other exemplary embodiments.

The terminal 101, in an illustrative embodiment, can be an Internet Protocol (IP) telephone. In other exemplary embodiments, the terminal 101 can be other types of a telecommunications terminal, such as a Personal Digital Assistant (PDA), softphone, Session Initiation Protocol (SIP) endpoint, H.323 endpoint, personal computer, etc. In any case, it will be clear to those skilled in the art, after reading this specification, how to make and use the exemplary telecommunications terminal 101.

The telecommunications network 102 can provide for end-to-end data communications between one or more clients, such as the terminal 101, and one or more servers, such as server 103. The network 102 can comprise the Internet, in accordance with the exemplary embodiments. In other exemplary embodiments, the network 102 can comprise a different network or networks (e.g., an Ethernet-based network, etc.), in addition to or as an alternative to the Internet. It will be clear to those skilled in the art how to make and use the exemplary network 102.

The server 103 can be, for example, a source of stored data content, such as web pages and other information that is presentable to a user. Moreover, the server 103 can be capable of transmitting and receiving packets of data that are related to the stored content, via the telecommunications network 102 in a well-known fashion. The server 103 can transmit the content in the form of one or more computer files to a client, such as the terminal 101, for example, either (i) when the client requests the content or (ii) autonomously. It will be clear to those skilled in the art, after reading this specification, how to format the computer files that contain the content. It will also be clear to those skilled in the art how to make and use the exemplary server 103.

Figure 2:
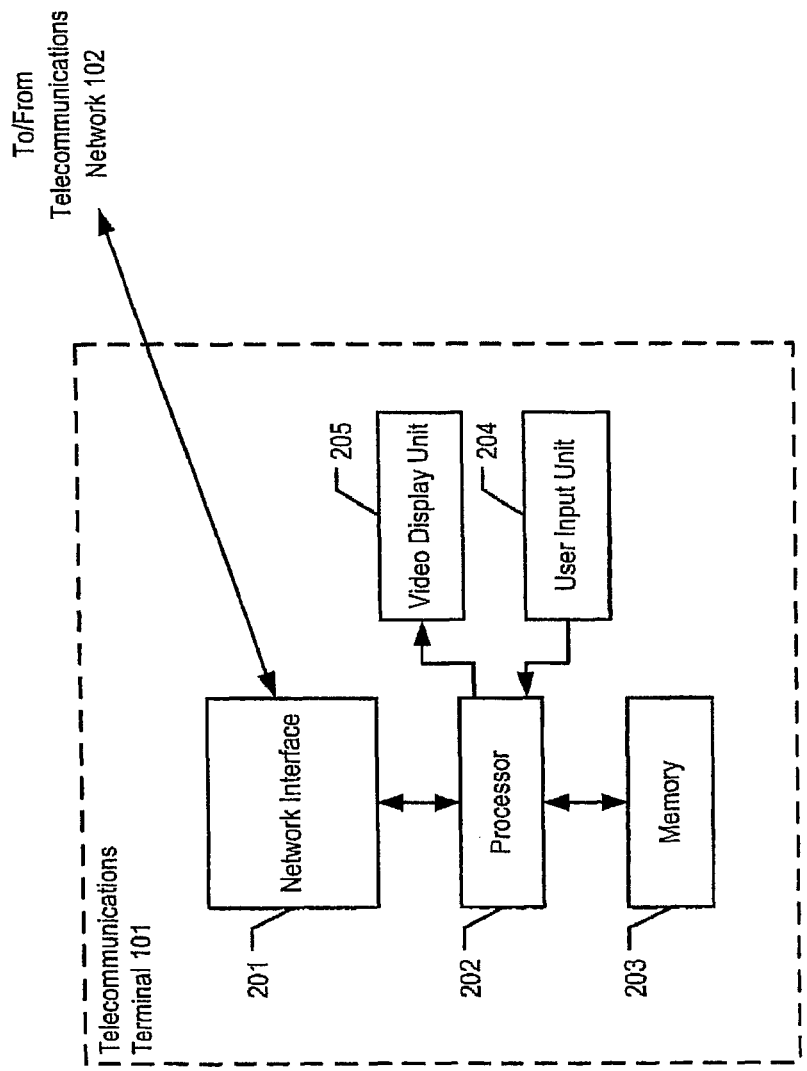
FIG. 2 depicts a block diagram of the salient components of telecommunications terminal 101, in accordance with an illustrative embodiment of the present invention.

FIG. 2 depicts a block diagram of the salient components of a telecommunications terminal 101, in accordance with an exemplary embodiment. The telecommunications terminal 101 can comprise, for example, a network interface 201, a processor 202, a memory 203, a user input unit 204, and a video display unit 205, interconnected as shown.

The network interface 201 can comprise a receiving part and a transmitting part. The receiving part can receive signals from the network 102, and forward the information encoded in the signals to the processor 202, for example, in a well-known fashion. The transmitting part can receive information from the processor 202, and output signals that encode this information to the network 102, in a well-known fashion. It will be clear to those skilled in the art, after reading this disclosure, how to make and use the exemplary network interface 201.

The processor 202 can be, for example, a general-purpose processor that is capable of (i) receiving information from the network interface 201 and the user input unit 204, (ii) reading data from and writing data into the memory 203, (iii) executing the tasks described below and with respect to FIGS. 14 through 23C, and (iv) transmitting information to the network interface 201 and the video display unit 205. In other exemplary embodiments, the processor 202 can be a special-purpose processor. In either case, it will be clear to those skilled in the art, after reading this disclosure, how to make and use the exemplary processor 202.

The memory 203 can be a non-volatile random-access memory that stores the instructions and the data used by the processor 202. In accordance an exemplary embodiment, the memory 203 also can store the browser application and the retrieved computer files that contain the data content. It will be clear to those skilled in the art how to make and use the exemplary memory 203.

The user input unit 204 is a character and user-selection input device that can receive input from a user and transmit signals that represents the input to the processor 202. The user input unit 204 can comprise fixed function keys (e.g., hard keys) and soft keys, and can provide a user input interface, for example, as shown in the exemplary embodiments described below. The user input unit 204 can comprise an array of buttons, for example, as described below. It will be clear to those skilled in the art, after reading this disclosure, how to make and use the exemplary user input unit 204.

The video display unit 205 can be a display output system that can receive a video signal and create a visual image of the signal for a user. The video display unit 205 can comprise a display, for example, as shown in the exemplary embodiments described below. It will be clear to those skilled in the art, after reading this disclosure, how to make and use the exemplary video display unit 205.

Figure 3:
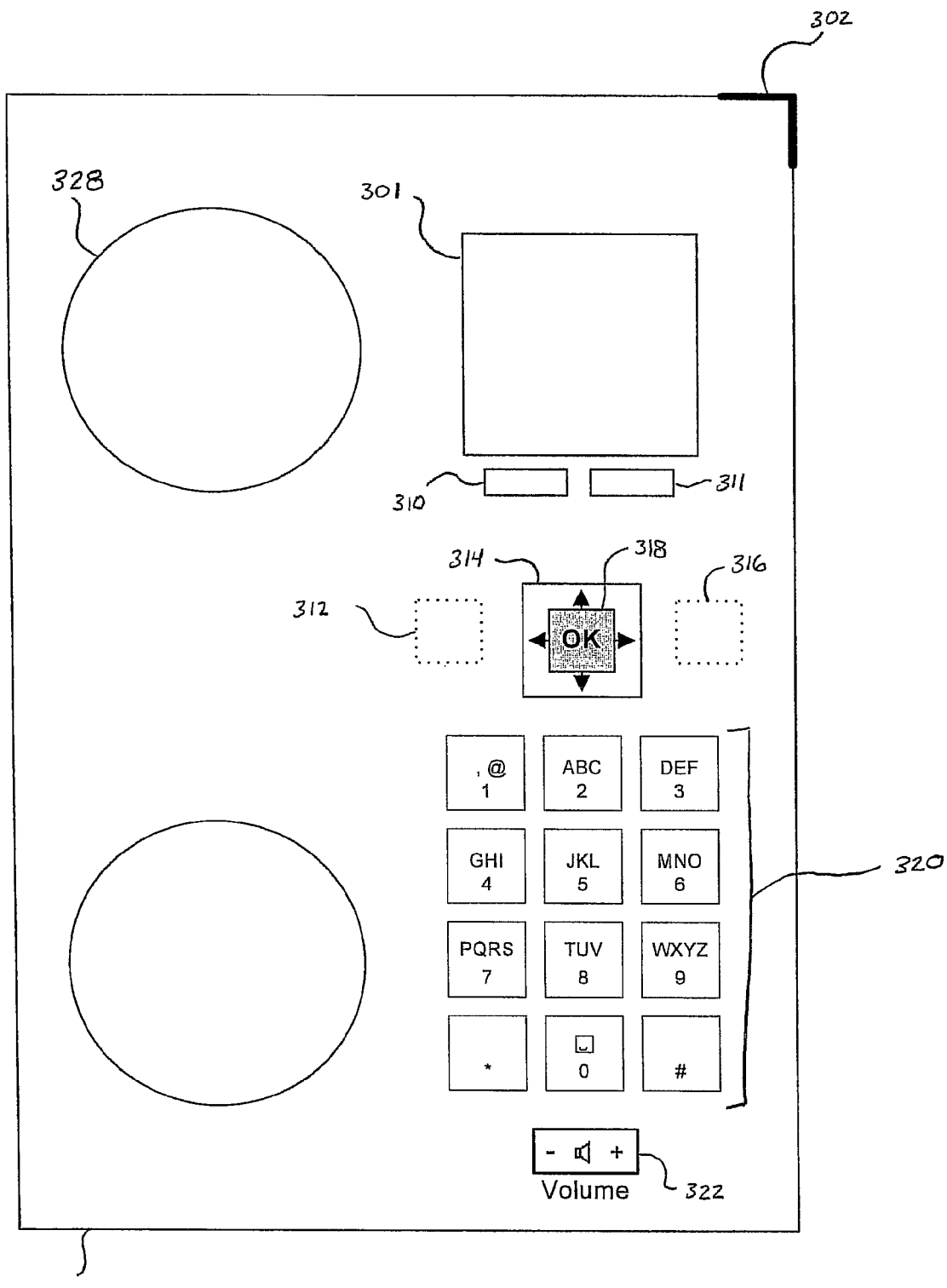
FIG. 3 depicts a portion of a front view of an embodiment of a telecommunications terminal.

FIG. 3 depicts a portion of a front view of one exemplary embodiment of a telecommunications terminal 300. The telecommunications terminal 300 can comprise, for example, a display screen 301, at least one softkey 310 and/or 311, at least one hard key 312 and/or 316, navigation keys such as arrow keys 314 and an 'OK' or select key 318, a numeric keypad 320, one or more audio control keys such as a volume control 322 or mute control (not shown), and a handset cradle 328. These exemplary features will be described in more detail below.

Figure 4:
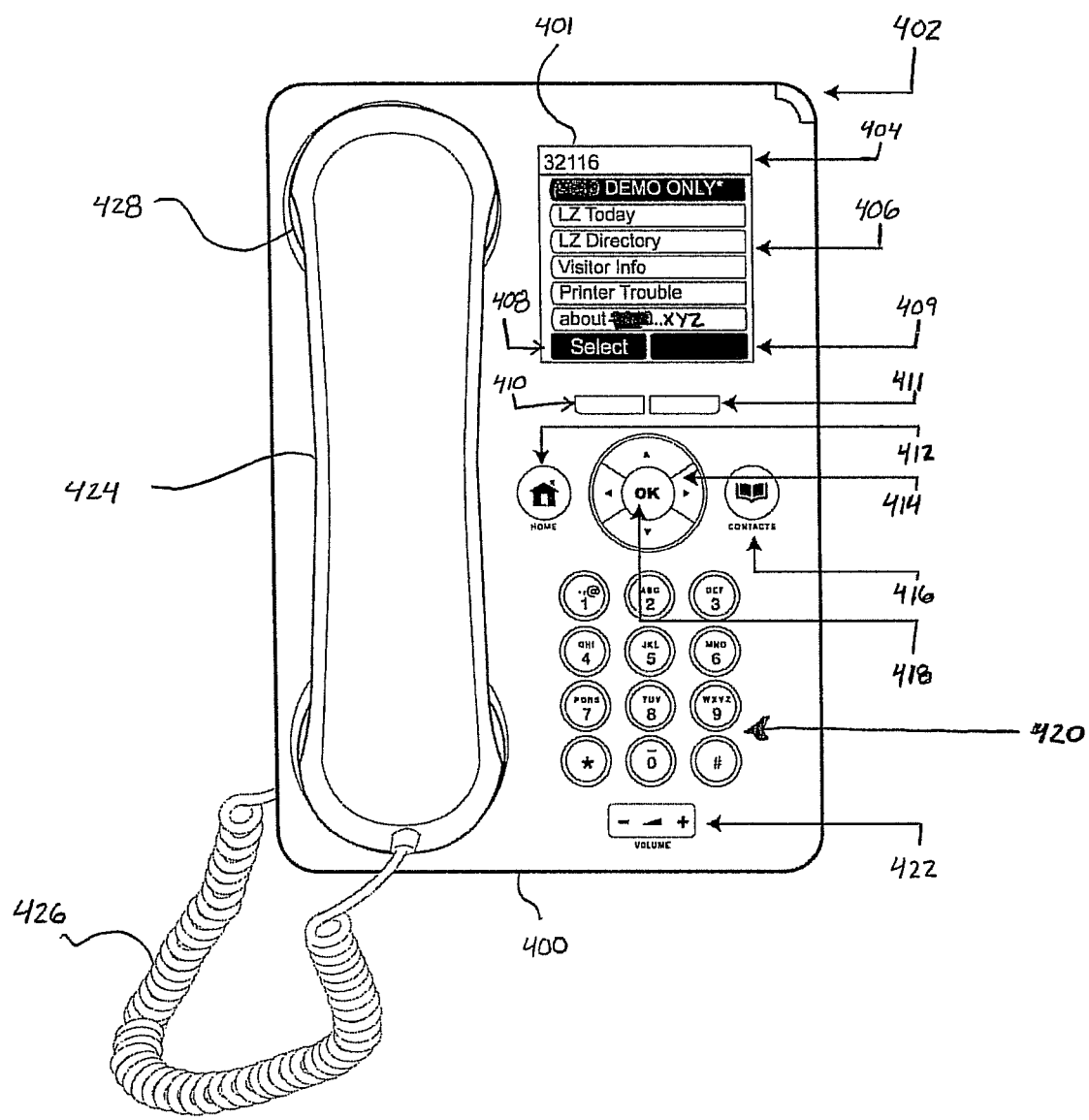
FIG. 4 depicts a portion of a front view of another embodiment of a telecommunications terminal.
Figure 13:
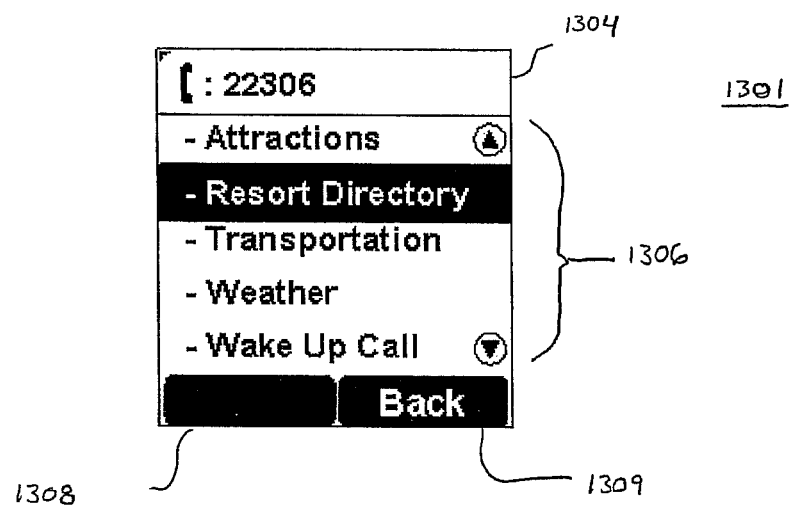
FIG. 13 depicts an embodiment of a user interface of a telecommunications terminal.

FIG. 4 depicts a portion of a front view of another exemplary embodiment of a telecommunications terminal 400. The telecommunications terminal 400 can comprise, for example, a display screen 401 having a plurality of lines. A top line 404 can be configured to show the telecommunications terminal extension number, instructions, and/or messages, etc., as will be described in greater detail below. The lines 2-7, as exemplarily illustrated in FIG. 4, can be configured, for example, as an information area 406, as will be described in greater detail below. The last or bottom line can be configured, for example, to show softkey labels 408 and 409, which correspond to the softkeys 410 and 411 that are positioned below the display screen 401, as will be described in greater detail below. The softkeys 410 and 411 can be positioned, for example, adjacent to the lower part of the display screen 401 such that the softkey labels 408 and 409 correspond to the softkeys 410 and 411. In other embodiments, the softkeys 410 and 411 can be configured to be located adjacent to the sides of the display screen 401.

The embodiment of FIG. 4 can include an arrangement of navigation keys, such as five-way navigation keys including up, down, left, and right keys 414 for scrolling operations and an 'OK' or select key 418, which can be centrally located between the up, down, left, and right keys 414. The hard keys 412 and 416, which will be described in greater detail below, can be configured to be adjacent to each side of the arrangement of navigation keys 414 and 418, as exemplarily illustrated in FIG. 4. In other embodiments, the hard keys 412 and 416 can be configured to be located on the same side, above, or below the arrangement of navigation keys 414 and 418.

The embodiment of FIG. 4 can include a numeric keypad 420, one or more audio keys such as a volume control 422 (e.g., volume up and volume down) or mute control (not shown), and a handset cradle 428 for receiving the handset 424. As shown in FIG. 4, the handset 424 can be a wired handset via cord 426. In other embodiments, the handset 424 can be a wireless handset. The telecommunications terminal 400 can include a message indicator 402 for providing a visual alert for incoming calls.

To further improve the ease of usability of the telecommunications terminal, other embodiments can include a display that is significantly larger than is conventionally found in a lobby phone. For example, one embodiment can provide a high resolution display supporting ¼ VGA gray scale with backlighting. Accordingly, the combination of the display, an embedded web browser, and the ability to host Phone Applications, can provide a user with a helpful portal of information that is easy to use and understand, which are features that are desirable for telecommunications terminals for use in common areas.

In one embodiment, the display screen 401 can be, for example, a 3.338-inch diagonal (e.g., approximately 2.36"× 2.36" (60 mm×60 mm) square), 160×160 pixel, 4-level gray scale display screen without a backlight. The embodiment having 160 pixels can accommodate approximately 16 characters. Other embodiments can include a backlight.

Embodiments of the display screen and screen regions will now be described with reference to FIGS. 4-13. As illustrated, for example, in FIG. 4, the screen 401 can be divided into 7 lines, with 20 pixels on each line, and gaps of 2 to 3 pixels between the lines. The 7 lines can be divided into three regions, for example:

| | |
|---|---|
| Line 1: | Top Line 404, |
| Lines 2 to 6: | Application Area or Information Area 406, and |
| Line 7: | Softkey Labels 408 and 409. |

In one embodiment, after registration, the Top Line 404 can be used to present application prompts and certain messages, as well as some or all Phone Application-related messages and data. For example, when there is a call activity, the Phone Application can use the Top Line 404 to display call-related messages.

The telecommunications terminal can be configured to have various display priorities. For example, the Top Line 404 display priority can be (1) Initial "Barge-in" pushed content, (2) Volume level, (3) Call Server-provided display information, dialed digits, or remotely generated messages (e.g., Web-based messages such as titles or "normal" (i.e., non-"barge-in") pushed text strings), (4) Existing "Barge-in" pushed content, and (5) the telephone extension, as obtained from the Call Server via a Registration/Admission/Status (RAS) procedure. In one embodiment, the telephone extension can be the Default Top Line 404 such that the extension is displayed centered on the Top Line 404.

With reference again to the exemplary display screen 401, an Application Area or Information Area 406 can include five lines, starting with the screen line 2 below the Top Line 404, and ending with screen line 6 above the softkey labels 408 and 409. In one embodiment, the Application Area 406 can be used to accommodate graphics taller than a single line, for example, in a wireless markup language (WML) browser application.

As shown in the embodiment of FIG. 4, the softkey labels 408 and 409 can include the bottom line and can be displayed, for example, in inverse colors (e.g., white-on-black). In the exemplary embodiment, the bottom line is divided into two softkey labels 408 and 409 with the text centered in each label. To distinguish between the left and right softkeys 408 and 409, the softkeys 408 and 409 are referred to as SK1 (e.g., 408) and SK2 (e.g., 409), for purposes of this disclosure.

In one embodiment, the hard keys 412 and 416 can be configured to be application keys. For example, the hard key 412 can be configured to be a [Start] application key or [Home] application key, which can be paired with the Start Application or Home Application. The hard key 416 can be configured to be a [Contacts] application key, which can be paired with, for example, an application as defined by the system administrator.

To suit the variety of customers' needs and contexts, the embodiments can limit the user interface (UI) components and reduce the complexity of the functionality of the application. For example, each application can be configured to have a "shallow" menu structure, which reduces the complexity of the interaction by the user.

The embodiments can have configuration and settings options that are intended, for example, for use by a walk-up user. The embodiments can be configured for clarity such that any learning is reduced or unnecessary for a user to use the applications. For example, the embodiments acknowledge that, if the function requires any prior familiarity with the application, then the function should be redesigned or removed.

The configuration and settings options can be configured such that they are not visible in the main applications and need to be triggered by a special key sequence, which may be known by (e.g., known only by) a system administrator. The embodiments can be configured such that the ability of walk-up users to edit the content and/or the menu in all areas of application can be limited or prevented.

The embodiments can be configured to have two categories of applications. For example, a Phone Application (PA) and an Information Application (IA).

An embodiment of a Phone Application (PA) will now be described. The Phone Application (PA) can be configured to handle the telephony functions of the communications terminal. In one embodiment, the Phone Application can be configured to handle one call, i.e., one call at a time. In one embodiment, the Phone Application may not have a hold function, such that when there is a call in progress, an additional call cannot be alerted (i.e., received) or placed.

The embodiments of the communications terminal can be configured such that the telephony functions take priority in the user interaction. For example, the Phone Application can request use of the Top Line 404 when the Phone Application is active, the Phone Application can be active when there are any call activities, and/or the Phone Application can be active whenever the handset 424 is off-hook (i.e., out of the cradle 428).

The embodiment can include an Information Application (IA). An embodiment of the Information Application will now be described. For purposes of this disclosure, the "Information Application" refers to any applications other than the Phone Application. An example of an Information Application can include a local application, such as the Main Menu and Contacts, which can follow the behavioral rules as described herein. Another example of an Information Application can include definitions for wireless markup language (WML) applications.

In some embodiments, the WML applications authored by customers or a third party may not adhere to the behavioral rules as described herein. However, in other embodiments, the WML applications authored by customers or a third party can be configured to adhere to the behavioral rules as described herein through definitions of a Software Development Kit (SDK), which can improve the ease of use by users of these applications.

In some embodiments, the Information Application can be configured to use both the Top Line 404 and the Application Area 406 of the display screen 401. For example, local applications can be configured to use the Top Line 404 for prompts, which can serve as the title of the application. A WML-based Information Application (IA) can be configured to use the Top Line 404 to display the title of the application, as determined, for example, by the author of the application. An Information Application also can be subject to different application context, as described below.

Phone Application/Information Application Interaction:

An embodiment of the Phone Application/Information Application Interaction will now be described. For example, a call can be placed from within an Information Application (IA), as a result of selecting a Call Item. Depending on whether the Phone Application (PA) is active, the Phone Application (PA) and the Information Application (IA) can divide the display 401 in several ways, as illustrated, for example, in FIGS. 5-12.

FIG. 5 depicts an embodiment of a display layout 501 having a top line 504, application area 506, and first and second softkeys SK1 508 and SK2 509. FIG. 6 depicts an embodiment of a display layout 601 having an Information Application including an Information Application title 604, an Information Application body 606, and softkeys SK1 608 and SK2 609. FIG. 7 depicts an embodiment of a display layout 701 having a Phone Application 704 and an Information Application body 706, as well as softkeys SK1 708 and SK2 709. FIG. 8 depicts an embodiment of a display layout 801 having Phone Application 804 configured to prompt the user to perform an operation or task, or to select softkeys SK1 808 and SK2 809.

Example implementations of the embodiments illustrated in FIGS. 5-8 will now be described with reference to the exemplary embodiments shown in FIGS. 9-12. For example, FIG. 9 illustrates a display layout 901 having a content page 906 of an Information Application that has an embedded item (e.g., Call item 908) and a title 904 in the top line. In FIG. 9, an embedded item 909 can be blank or can contain a link to another item, informational content, or action.

FIG. 10 illustrates a display layout 1001 of an Information Application with a title 1004, a menu 1006, and an embedded call item 1008. As shown in FIG. 10, the first item (e.g., front desk) in the menu 1006 can be highlighted. In FIG. 10, an embedded item 1009 can be blank or can contain a link to another item, informational content, or action.

FIG. 11 illustrates a display layout 1101 of a Phone Application that takes priority over the top line 1104 when there is a call being placed or received and can display, for example, a call icon and/or the number of the call being placed or received.

The title no longer appears. However, the menu 1106 and an embedded call item 1108 can be displayed in the application area. Similar to FIG. 10 above, an item, for example, which may correspond to the call being placed or received (e.g., front desk) can be highlighted in the menu 1106. In FIG. 11, an embedded item 1109 can be blank or can contain a link to another item, informational content, or action.

FIG. 12 illustrates a display layout 1201 of a Phone Application that can prompt the user to pick up the handset to be connected. For example, when a call is received and the handset is on-hook, the Phone Application can take priority over the top line 1204 and display, for example, a call icon and/or the number of the call being received. The title no longer appears. The Phone Application can take priority over the application area to display the prompt 1206 to prompt the user to pick up the handset. An embedded call item 1209 (e.g., cancel) can be displayed in the application area. In FIG. 12, an embedded item 1208 can be blank or can contain a link to another item, informational content, or action.

Figure 14:
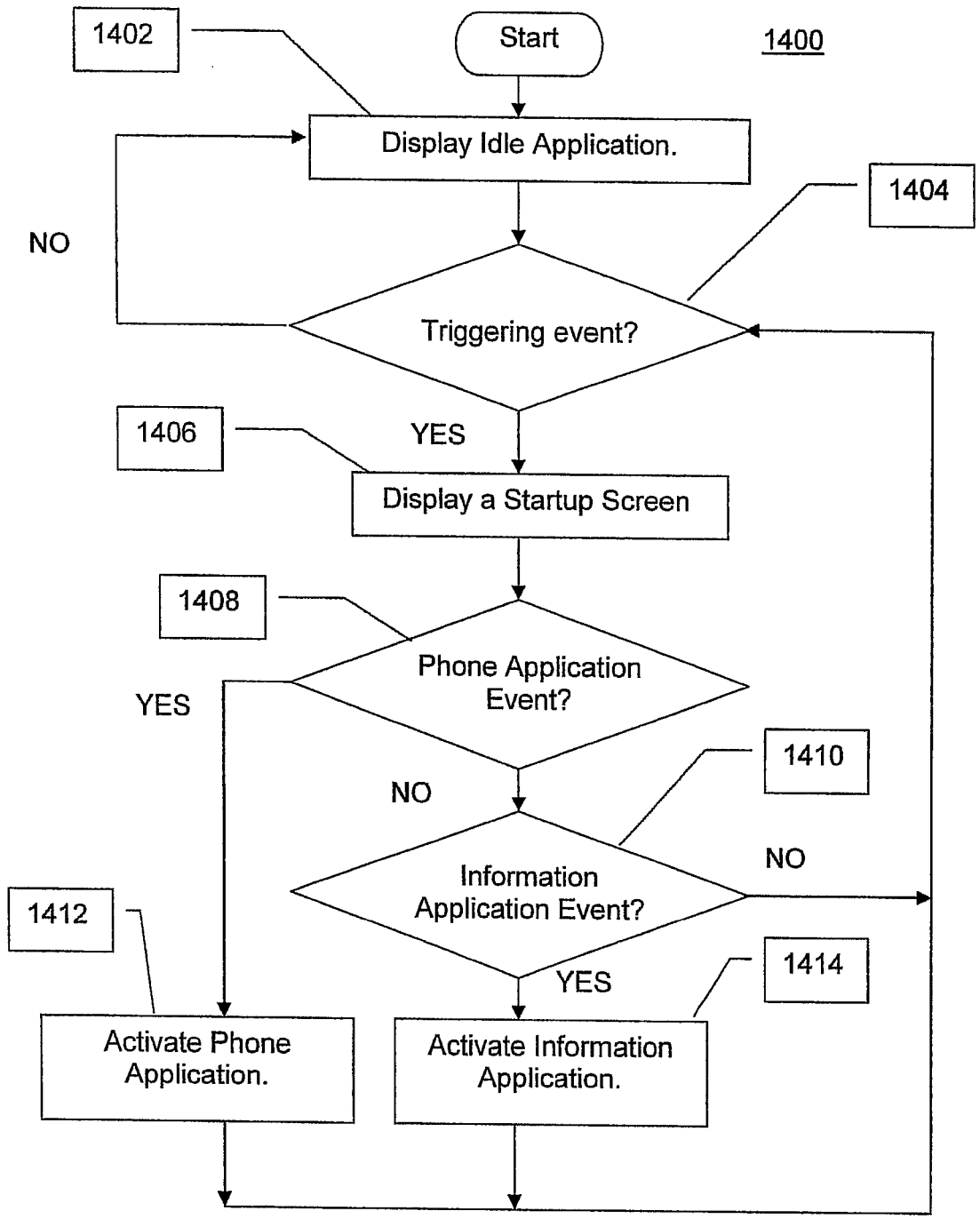
FIG. 14 depicts a flow diagram of an exemplary embodiment.

FIG. 14 illustrates an exemplary embodiment of a method 1400 which includes displaying an Idle Application 1402 on a display screen of the walk-up telecommunications terminal. When a triggering event 1402 occurs, a Startup Screen can be displayed 1406 on the display screen of the walk-up telecommunications terminal. If a Phone Application event 1408 occurs, the Phone Application can be activated 1410. If an Information Application 1410 occurs, the Information Application can be activated 1412. In the exemplary embodiment, the Phone Application can be configured to take priority over the Information Application in the user interaction with the walk-up telecommunications terminal. For example, if an Information Application is active and a Phone Application event occurs, the Phone Application can be given priority over the Information Application.

Another embodiment includes a computer-readable medium having computer-executable instructions contained therein for a method of providing access to a telephone Application and an Information Application using a walk-up telecommunications terminal having an intuitive, context-sensitive interface configured to facilitate simple and intuitive usage by a user, as described, for example, in FIG. 14.

Another embodiment includes a method of providing information to a user of a walk-up telecommunications terminal and allowing the user to place a call to an intended destination. The method can include displaying an Idle Application on a display screen (e.g., 1402 in FIG. 14) of the walk-up telecommunications terminal when an idle time exceeds an idle threshold. The idle time can be defined, for example, as a time that the Phone Application and the Information Application are inactive. Alternatively, the idle time can be defined as a time that only one of the Phone Application and the Information Application are inactive. For example, if the Information Application is inactive while the user is using the Phone Application, the Idle Application can display the default Idle Application which can include, for example, the idle splash screen, banners plash screen, etc. The Startup Screen can be displayed (e.g., 1406 in FIG. 14) on the display screen of the walk-up telecommunications terminal in response to a triggering event (e.g., 1404 in FIG. 14), such as a key of the walk-up telecommunications terminal being pressed, a handset of the walk-up telecommunications terminal being taken off-hook, an incoming call, and/or a barge-in or HTTP push, etc. The Phone Application can be activated (e.g., 1412 in FIG. 14) in response to a Phone Application event (e.g., 1408 in FIG. 14). Similarly, the Information Application can be activated (e.g., 1414 in FIG. 14) in response to an Information Application event (e.g., 1410 in FIG. 14). In this embodiment, the Phone Application can be configured to take priority over the Information Application in the user interaction with the walk-up telecommunications terminal.

FIG. 15 depicts a table of exemplary user interface flow diagrams and sub-flow diagrams, as depicted FIGS. 16A-23C. The exemplary call flows are not an exhaustive, but instead, are intended to illustrate the exemplary embodiments described herein. The embodiments of the telecommunications terminal can be configured for other permutations of the call flows. The embodiments of the call flows are based on the exemplary configuration of a telecommunications terminal following Example 1:

| Idle Application: | Idle Splash Screen. |
|---|---|
| Default Application: | Main Menu. |

In the embodiments of the call flows illustrated in FIGS. 16A-23C, the symbol "[" means "Active Call" and "B" means "Bell icon for incoming call."

Figure 23C:

FIGS. 16A, 16B, and 16C depict exemplary embodiments of a basis call flow diagram F100 of a telecommunications terminal. FIG. 17 depicts an embodiment of a flow diagram for off-hook calling from a call item of a telecommunications terminal. FIGS. 18A and 18B depict an embodiment of a flow diagram for digit collection in a Phone Application of a telecommunications terminal. FIGS. 19A and 19B depict an embodiment of a flow diagram for off-hook navigation of a telecommunications terminal. FIGS. 20A and 20B depict an embodiment of a flow diagram for calling from a call item of a telecommunications terminal. FIGS. 21A and 21B depict an embodiment of a flow diagram for Contacts as a List Application of a telecommunications terminal. FIGS. 22A, 22B, and 22C depict an embodiment of a flow diagram for on-hook navigation of a telecommunications terminal. FIGS. 23A, 23B, and 23C depict an embodiment of a flow diagram for a Communication Manager (CM) Directory of a telecommunications terminal. The exemplary features illustrated in FIGS. 16A to 23C will be described below.

As mentioned above, since the communications terminal (e.g., 300 and 400 in FIGS. 3 and 4) can be configured to be used in a plurality of different locations, some embodiments can provide methods for customers to customize the applications to suite their respective needs. However, in some embodiments, it may be desirable to configure the communications terminal such that the Phone Application cannot be customized.

Customization of Information Applications:

An embodiment in which the Information Application is customized will now be described. Customization of Information Applications can be performed by customers adding, removing, or replacing or editing the title or the body of the Information Application (IA), or changing the linkage between a plurality of Information Applications. The extent to which an Information Application can be customized can depend on whether the application is a local application or a wireless markup language (WML) application.

Customization of the Title:

An Information Application (IA) has a title that can be placed in the Top Line. If the application is a local application, the Top line can be used for a prompt, which can be understood as the title of the application. In some embodiments, the Top Line in a local application may not be customizable.

The title of a wireless markup language (WML) application can be customizable. If a menu is displayed as the result of selecting on a connector item, by convention, the label of the connector item can be used as the title of the menu, which can be conveyed in a Software Development Kit (SDK). In some embodiments, the title can be blank, if desired by the administrator.

Customization of the Body:

In one embodiment, the body of an Information Application (IA) can contain either a menu or a content screen. In another embodiment, the body of a wireless markup language (WML) Information Application (IA) can contain both.

The body of an Information Application (IA) containing a menu will now be described. For purposes of this disclosure, a menu generally is a list of items. In some embodiments, the sequence of the menu items can be defined by the system administrator.

For example, a menu item can be defined as a connector item, which is a menu option that links to another application or another place in the same application. Defining a menu option as a connector item does not imply that it is created in a wireless markup language (WML) browser environment. Instead, the term connector item can denote to its property to trigger presentation of another screen in the same or a different application.

The Top area of the menu can be triggered by the Connector Item to replicate the label of the Connector Item.

In one embodiment, the default softkeys for a Connector Item can be SK1: [Select], which can trigger the function of the Connector Item, and SK2: [Back], which can bring the user back to the previous screen. The two default softkeys can be sufficient to support a very complicated navigation structure. However, in some embodiments, the two default softkeys can be modified by the customer to support a unique action or actions.

In a local application, the [Back] SK can be configured to require a definition of specific application. In a wireless markup language (WML) environment, the [Back] SK can use the history stack. If there are no previous screens in the Navigation Path, then the [Back] SK will not be available. In some embodiments, depending on how the administrators customize the application, the 'previous' screen may not be the upper level of the current application's navigation structure. To avoid confusion, the "Back" softkeys can be configured to take the user back one step on the navigation path.

As another example, a menu item can be defined as a call item, which is a menu option that contains a label and a pre-defined destination. Selecting the Call item can launch a call to the destination. The default softkeys for a Call item can be SK1: "Call", which can place a call to the destination of the Call item, and SK2: "Back" which can bring the user back to the previous screen. When a call is placed by a Call item, the Phone Application (PA) can display the label of the call item on the Top Line. In one embodiment, the call item can be subject to a "one call" limit. For example, if the Phone Application (PA) is configured to only handle one call, and if there is already one call, the Call SK1 can be removed.

The body of an Information Application (IA) containing a content screen will now be described. For purposes of this disclosure, a content screen can be plain text or wireless markup language (WML) content that displays information. It is a method for customers to provide information and allow a walk-Lip user to place a call to the intended destination.

When a content screen is presented alone (i.e., not with a menu), the content screen can have an embedded Call Item.

For example, a Display [Call] SK1 can be provided. Pressing [Call] SK1 can place a call to the destination of the embedded call item. The Phone Application (PA) can be triggered and can take the Top Line. The [Call] SK can be subject to the on/off-hook processing.

As another example, the [Back] SK2 can be provided. If there is already a call in progress, the [Call] SK1 can be disabled.

Information Application Contexts:

An Information Application (IA) can be placed in one or more of the following application contexts. These can be special contexts that trigger the associated Information Application (IA) as the result of a user interaction.

Idle Application:

The Idle Application can be configured to be triggered when the idle time exceeds an idle threshold. The idle time generally is defined as the time that Phone Application (PA) is on the hook (i.e., the handset is on the cradle) and communications terminal does not encounter any user interaction. In some embodiments, the idle threshold can be defined by the system administrator. An Idle Splash Screen can be configured to be the default Idle Application. The Idle Splash screen can be a WML-based application that the customer can provide for branding purposes.

Start Application:

The Start Application can be displayed when the user lifts the handset or presses any navigation keys during the idle state. In some embodiments, this may be feasible only when the Idle Application is an Idle Splash Screen that does not provide any information or calling functions, to avoid confusing the user. This configuration can be clarified by a Software Development Kit (SDK).

The Start Application also can be displayed when the user selects [Start] SK1 (if one is provided in the wireless markup language (WML) application) or hardkey (HK). When the Start Application is activated, the navigation path can be reset. The Main Menu can be the designated as the Start Application. When the Main Menu contains only one item, the communications terminal can be configured to automatically launch that item. According to this embodiment, another application, such as the Contacts or the Directory, can be configured to behave as the Start Application by including the desired application, such as the Contacts or the Directory, as the only item in the Main Menu.

List Application:

In one embodiment, a List Application can be displayed when the user presses the [Contacts] hardkey. The Contacts can be the designated List Application. To provide maximum flexibility to customers, an administrator can set the same application in more than one application context.

Example Configuration 1:

Idle Application=Idle Splash Screen

Start Application=Main Menu

In this example embodiment, the user will see a branded Splash screen when the user approaches the communications terminal. When the user picks up the handset or presses the [Start] button, the Main Menu is displayed on the screen.

Example Configuration 2:

Idle Application=Contacts

Start Application=Contacts

In this example embodiment, the user will see a list of speed dial options on the screen. The screen will remain unchanged when the user picks up the handset. However, when the Idle Application is different from the Start Application, the Idle plash Screen can be the Idle Application.

User Interaction:

Idle:

As described above, the Idle state generally is defined as being a result of the user not interacting with a communications terminal that is on the hook (i.e., the handset is in the cradle) for a period of time longer than an idle time threshold, which can be set by an administrator.

When the communications terminal enters the idle state, the Idle Application is triggered and the navigation path can be reset. The Idle Application can be defined by the system administrator. The following are examples of standard choices for the Idle Application: Idle Splash Screen, or any other browser application; Splash Screen; Main Menu; Contacts; and Directory.

Start/Restart:

The Start Application can be displayed when a user starts or restarts using the phone. During the Start process, the communications terminal terminates the idle state because of the following events:

The user takes the phone off the hook (i.e., the handset is removed from the cradle). The communications terminal can be configured such that the action of the user taking the phone off of the hook is a call action that will trigger the Phone Application under any circumstance. Going off-hook during the idle state can trigger both the Start Application and the Phone Application.

The user presses any key other than the [Contacts] hardkey. If the user presses the [Contacts] softkey, the idle state also can be terminated, and the List Application can be displayed instead of the Start Application.

Incoming call.

HTTP push.

The communications terminal can be configured to restart if the user presses the [Start] softkey (i.e., if a [Start] softkey is provided in the wireless markup language (WML) application) or hardkey during a state that is not idle. The navigation path also can then be reset.

The Start Application can be defined by the system administrator. The following are examples of standard choices for the Start Application:

Main Menu

Applications other than the Main Menu (e.g., Contacts, Directory, or any browser application).

In one embodiment, if the Main Menu is intended to be the Start Application, then the Idle Splash Screen may not used as the Start Application.

List Application (IA):

The List Application can be displayed when the user presses the [Contacts] hardkey. The communications terminal can be configured such that there is no distinction between a user interaction with a Start Application or a List Application. All Information Application user interactions can follow identical rules. The content of List Applications can be defined by the system administrator. The List Application can be the same as the local application Contacts.

Current Application (Information Application (IA) or Phone Application (PA)):

The current application refers to the application that is being displayed in the Application Area of the screen at the moment. The Current Application is a result of user interaction with communications terminal, and generally is not predefined. In some embodiments, the Current Application generally will be an Information Application.

For example, if the Phone Application (PA) is active, the Current Application coexists with the Phone Application (PA) on the screen. If the current application has a title line, then the title line will be replaced by the call information of Phone Application (PA) if the Phone Application (PA) is present.

Phone Application as the Current Application:

In one embodiment, the Phone Application (PA) can become a current application and use the application area, for example, in the following situations:

To display a prompt to ask the user to pick up the handset, when the communications terminal is on the hook and the user attempts to engage in an action that requires the phone to be off-hook. As soon as the communications terminal is taken off the hook, the action can be engaged and the Application Area can be returned to the previous current application. In this context, the [Cancel] SK2 will negate the attempt and return the screen to prior to the attempt. The [Start] hardkey or [Contacts] hardkey implies [Cancel]. Thus, the attempt is negated and Current Information Application (IA) will switch accordingly. Also, the navigation keys are considered to be invalid entries.

To display an error message to inform the user that a call is already in progress, an attempt to launch another call can not be executed. In this context, the [Cancel] softkey SK2 will negate the attempt and return the screen to prior to the attempt. The [Start] hardkey or [Contacts] hardkey can imply [Cancel]. The attempt can be negated and the Current Information Application (IA) will switch accordingly. Also, the navigation keys are invalid entries.

Switching the Current Information Application:

In one embodiment, applications in the Application Area can be switched, for example, in the following conditions:

The telecommunications terminal ceases to be idle.

The telecommunications terminal becomes idle (e.g., the idle time exceeds a threshold).

The user presses the [Start] softkey or hardkey, in which case the telecommunications terminal will switch to the Start Application.

The User presses the [Contacts] hardkey, in which case the telecommunications terminal will switch to the application paired with the [Contacts] hardkey.

The user selects a Connector Item that triggers another application.

If the new application contains a menu, the highlight goes to the first menu item of the new current application after the switch.

Scrolling:

Menu Scrolling:

An embodiment in which the user scrolls with [Up] and [Down] hardkey will now be described. With each press on the [Up] or [Down] hardkey, the highlight moves up or down by one item, respectively. If the user presses and holds the [Up] or [Down] hardkey, the scrolling continues in the direction of the hardkey. The speed of scrolling accelerates if user continues to press and hold the [Up] or [Down] hardkey. For example, the telecommunications terminal jumps directly to the next screen of the menu in the direction of the hardkey, if the menu is longer than what the current screen can contain. If the user attempts to scroll up beyond the first item of the menu displayed on the first screen, the [Up] hardkey is considered invalid. If the user attempts to scroll down beyond the last item of the menu displayed on the last screen, the [Down] hardkey will bring the screen back to the first screen of the menu.

As the user scrolls, the current items in the display list will be highlighted. The softkey labels change to reflect actions available for the highlighted item. The functions, such as "Select" or "Call", which are activated by each softkey will apply only to the highlighted item. A user action from a menu item (e.g., a Connector Item or Call Item) is a combination of the current item and the soft key. The process of scrolling to a menu item alone does not trigger the function.

"v" Indication:

In one embodiment, the list may contain more items than can be accommodated by the application area. In such a case, the last line of the application area will indicate "v" at the end of the line to indicate that there are more items in the menu. The text on the last line may be truncated because of the "v" indication. If the user continues to scroll downward after the line that contains the "v" indication, the menu reveals the next screen of the menu. The graphical representation of the "v" indicator can be a filled-in, downward pointing triangle, consistent with the triangle on the Down navigation key, surrounded in a circle.

"^" Indication:

If the menu as presented on the screen is not the first screen of the menu, the first line of the application area displays a "^" indication at the end of the line. The text on the first line may be truncated because of the "^" indication. If the user continues to scroll upward beyond the line that contains the "^" indication, the menu reveals the previous screen of the menu. The graphical representation of the "^" indicator can be a filled in, upward pointing triangle, consistent with the triangle on the Up navigation key, surrounded in a circle.

Content Scrolling:

When the user scrolls with the [Up] and [Down] hardkeys, the general rules of menu scrolling can be followed. However, content scrolling moves between 'screens'. If the content screen can be accommodated by an Application Area, there is only one screen and there is no visible scrolling. If a content screen is longer than the Application Area can contain, then the content screen is divided into screens by the size of the Information Application's Application Area. When there are multiple screens, the "v" indicator and "^" indicators are displayed accordingly. Each press on the [Up] or [Down] hardkey moves the screens up or down, respectively. If the user attempts to scroll up beyond the first screen of the content displayed on the first screen, then the [Up] hardkey is considered invalid. If the user attempts to scroll down beyond the last screen of the content, the [Down] hardkey will bring the screen back to the first screen of the content. The screens of content generally are not highlighted.

Navigation Path:

Due to limitations of capability to manage history stacks across applications, the Navigation Path as described in the exemplary embodiments generally applies to wireless markup language WML application.

The navigation path generally refers to the user-experiences of selecting a series of links. The structure of Information Applications follows a tree-like structure, where each level can provide a menu that contains the Connector Items to the next-level menu. However, the Connector Item can also link to other applications or other locations in the same applications (e.g., cross-branches) without following a hierarchical order.

The telecommunications terminal can retain the navigation track as the user selects a series of Connector Items, although the series of the Links may not follow a path of a tree-structure. The navigation ends when the user selects a terminal screen or a call item. The navigation path is reset when the telecommunications terminal enters idle state. The navigation path can be reset when the user presses the [Start] hardkey to return to the Start Application.

[Up]/[Down] Arrow Keys:

The [Up]/[Down] hardkeys can be used to scroll. The [Up] moves the highlight upward from its current position. The [Down] moves the highlight downward from its current position.

[Left]/[Right] Arrow Keys:

If the telecommunications terminal is in text entry mode, then the [Left] hardkey moves the cursor to the left by one character, and the [Right] hardkey moves the cursor to the right by one character.

If the telecommunications terminal is not in the text entry mode, then the [Left] hardkey displays the previous screen on the navigation path. It is the same function of the [Back] softkey, even when the [Back] softkey is not available.

If the current screen is on the first stop of the navigation path, then the [Left] hardkey is considered an invalid action, and the [Right] hardkey displays the next screen on the navigation path.

If the current screen is at the last stop of the navigation path, then the [Right] HK is considered an invalid action.

OK Key:

In one exemplary Phone Application (PA), the [OK] key does not have a function. However, in an Information Application, the OK key can be configured to execute context-specific actions, and accordingly, mirrors the SK1 function. For example:

---
If a [Select] SK1 is available, OK = [Select] SK.
If a [Call] SK1 is available, OK = [Call] SK.
If SK1 is blank, and:
    If SK2 is [Cancel], OK is = [Cancel] SK.
    If SK2 is not [Cancel], OK is not a valid entry.
---

Calling:

In one embodiment, all of the Calling interactions can be operated by the Phone Application (PA). Examples of user calling actions can include the phone being off of the hook, and the [Call] softkey on a Call item.

One embodiment of the telecommunications terminal does not have speakerphone capability, and therefore, in this embodiment, before the call can be placed the user will need to go off-hook (i.e., the handset will need to be removed from the cradle).

The following are exemplary embodiments of On-hook and Off-hook interaction when the user selects [Call] SK:

If the user takes the telecommunications terminal off-hook, then the Phone Application (PA) can take input from the numeric keypad and relay to the switch. The [Call] softkey, if available, will place the call to the destination of the Call item. The call will be displayed in the Top Line. The current application will not change.

If the telecommunications terminal is on-hook, then the [Call] softkey can prompt the user to lift the handset, for example, by displaying an instruction such as "Please pick up the handset to be connected." Other instructions also may be displayed to prompt the user to lift the handset. When the call is connected, the call can be displayed in the Top Line. The Application Area can return to the current application.

In either of the above examples, an active call can be terminated if the user goes on-hook.

Error Tone Generation:

When an invalid key is pressed, an error tone can be generated.

Supplied Applications:

Idle Splash Screen:

The Idle Splash Screen can be configured to display graphic or text content for branding purpose as determined by the customer when the telecommunications terminal is idle. The Idle Splash screen can be configured to be a customized wireless markup language WML application, which is administered as the Idle Application.

The idle Splash can contain parts, such as a display area, including a Top Line and an Application area that contains, for example, branding elements, a welcome message, a simple instruction, a logo, or an animation. One softkey can be mandatory for the Idle Splash Screen application, such as the [Start] SK1 to access the Main Menu application.

The use of SK2 can be configured to depend on the application administered as the Idle Splash Screen. In the Default Splash Screen, the SK2 can be the [Contacts], which can trigger the Contacts local application, if the Contacts application is non-empty. In a wireless markup language WML application, the SK2 can be administered for any other application or a call item. Such features can be configured according to a Software Development Kit (SDK).

For Example:

A Call item that calls the security with the [Security] key as the SK2.

A Connector item that displays the List Application, with the name of the application as the SK2.

A Connector Item that displays help content, with the [Help] key as the SK2.

Main Menu (IA):

The Main Menu can be displayed as the Start Application or when the user presses the [Start] softkey or hardkey. The Main Menu can contain the Connector Items and Call items. The connector Items can be configured to trigger other applications.

Contacts (IA):

In one embodiment, the Contacts generally is defined as an application that contains a list of Call items. The listing in the Contacts Application can be used as a Speed Dial list. In one embodiment, the Contacts applications may not contain any detail information available, such as multiple phone numbers per entry, editing, grouping or searching functions.

Directory (IA):

An administrator can create a "Directory" Connector Item to trigger the Communication Manager (CM) Directory function. An example illustration of the CM Directory will be discussed below. The CM Directory can be supported, for example, when the following feature buttons are administered:

Directory.

Next.

MakeCall.

The supplementary instructions can be supplied to assist the users as they press a key on each step. The CM Directory application can be displayed in the Application Area. A short prompt can be displayed in the application area that changes from "Enter letter:" to "Enter next letter:" as another key press is entered. The result can then be displayed from the CM. The letters can be highlighted as each new keypad entry is received and can be reflected on the result.

An embodiment of exiting the Directory will now be described with respect to the case in which a call is placed, for example, from within Directory:

If the telecommunications terminal is on-hook, then the Phone Application (PA) prompts the user to go off-hook.

If the telecommunications terminal is off-hook, then a call is placed upon depressing the [Call] softkey.

One embodiment can include a Special Interaction for the CM Directory, in which the current Information Application (IA) returns to the menu that contained the Directory Connector Item.

An embodiment of exiting the Directory will now be described with respect to the case in which the telecommunications terminal becomes idle. In this case, the telecommunications terminal can exit the Directory and display the Idle Application. An embodiment of exiting the Directory will now be described with respect to the case in which a call is placed from within Directory.

Another embodiment of exiting the Directory can include depressing the [Cancel] softkey.

Phone Application:

Exemplary embodiments of the Phone Application will now be described.

Triggering Phone Application:

If the Phone Application (PA) is not active, then the Phone Application (PA) can be triggered by calling actions or incoming call. For example, a user calling action or a system event, such as an incoming call can trigger the Phone Application.

Phone Application Stays Present on Display:

The Phone Application can be configured to stay present on display if the telecommunications terminal is off-hook, or if there is still an incoming call alert.

Phone Application Disappears:

The Phone Application can be configured to disappear from display in the following exemplary conditions:
  The user places the phone on-hook. If there is an active call, the call is terminated.
  The phone is on-hook and the incoming call alerting terminates.
  A barge-in or HTTP push will make the Phone Application (PA) temporarily disappear.

Presentation of Phone Application:

An exemplary presentation of the Phone Application will now be described.

Top Line:

For normal call activities, the Phone Application (PA) will use the Top Line to display, for example, the call status (Active or Incoming), and the calling/called party.

Application Area:

In one embodiment, the Phone Application will not use the Application Area or affect the current Information Application (IA) being displayed in the Application area. In this embodiment, the Phone Application can be configured to use the Application Area in two situations (e.g., only two situations):
  The Phone Application takes over the Application Area to display a prompt for the user to go off-hook for the following exemplary reasons: The phone is on-hook, but the user presses [Call] SK, and the phone is on-hook, but the user triggers a click-to-dial tag in wireless markup language (WML) application.
  The Phone Application takes over the Application Area to display an error message when there is already a call in progress, and the user attempts to place another call by pressing the [Call] softkey or triggers a click-to-dial tag in wireless markup language (WML) application.

Incoming Call:

In one embodiment, the telecommunications terminal is configured to handle only one call at a time. Accordingly, in this embodiment, an incoming call alert is delivered only when the telecommunications terminal is on-hook. An incoming call cannot be received when the telecommunications terminal is off-hook.

In one embodiment, when there is an incoming call, the call will be displayed in the Top Line. In another embodiment, the user can answer the call by going off-hook. Incoming call states can be terminated when the user goes off-hook to answer the call, the call ceases to exist as a result of the far end hanging up (i.e., the other party to the communication hangs up), or the call goes on coverage path.

Digit Collection:

In one embodiment, when the telecommunications terminal is in a text entry mode (for example, an Access Key scenario), the pressing of the numeric keypad by the user can be processed as text input, and the digits can be prevented from being collected by the Phone Application (PA).

In another embodiment, when the telecommunications terminal is not in the text entry mode, and when the telecommunications terminal is off-hook, the digits can be collected by the Phone Application (PA). For example, when there is an active call, the pressing of the numeric keypad by the user can be treated as dual tone multi frequency (DTMF), and accordingly, are not echoed on the screen. As another example, when there is no active call, the pressing of the numeric keypad by the user can be treated as digits being collected, and accordingly, can be echoed on the screen.

In another embodiment, when the telecommunications terminal is not in the text entry mode, and when the telecommunications terminal is on-hook, the digits are not collected by the Phone Application (PA).

One or more of the foregoing aspects may provide one or more of the following advantages.

For example, the exemplary embodiments can provide an intuitive, simple, and easy to use telecommunications terminals for use by visitors, customers, building employees, etc. in common areas or shared spaces of a customer's location, such as building or hotel lobbies, hospital entrances, corporate conference rooms, reception areas, waiting areas, printer or copier rooms, break-rooms, hallways, etc. The exemplary embodiments can enable walk-up users to easily perform telephony tasks and/or informational tasks without prior knowledge of the telecommunications terminal.

The exemplary embodiments also can be configured for brief interaction between the user and the telecommunications terminal for performing, for example, a simple telephony or information task. Such telecommunications terminals can be shared by a plurality of visitors, building employees, etc. Accordingly, the embodiments can provide easy access to features that can be helpful for building visitors, and the features of the exemplary user interface can be configured for use in common areas, instead of for an individual user. The embodiments also can provide enhanced and improved productivity of users, for example, through prompting for common telephony tasks, one-touch access to key features, and superior high fidelity audio.

The exemplary embodiments can provide an intuitive user interface. For example, one embodiment can provide an intuitive, context-sensitive interface configured to facilitate simple and intuitive usage by featuring context-driven menus with on-screen prompts, which can enable straightforward access to, for example, a welcome menu and contact Directory. Accordingly, the embodiments can be simple and easy to use by building visitors and other users in common areas.

Accordingly, the combination of the Information Application and the ability to host Phone Applications, can provide a user with a helpful portal of information that is easy to use and understand, which are features that are desirable for telecommunications terminals for use in common areas.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include a computer readable media embodying a method for providing access to a telephone Application and Information Application using a walk-up telecommunications terminal having an intuitive, context-sensitive interface configured to facilitate simple and intuitive usage by a user. Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of providing access to a Phone Application and an Information Application using a walk-up telecommunications terminal having an intuitive, context-sensitive interface configured to facilitate simple and intuitive usage by a user, the method comprising:
    displaying an Idle Application on a display screen of the walk-up telecommunications terminal;
    displaying a Startup Screen on the display screen of the walk-up telecommunications terminal in response to a triggering event;
    activating the Phone Application in response to a Phone Application event;
    activating the Information Application in response to an Information Application event,
    wherein the Phone Application is configured to take priority over the Information Application in the user interaction with the walk-up telecommunications terminal by taking control of and changing at least a portion of the display screen displaying information relating to a local application other than the Phone Application.

2. The method of claim 1, wherein at least one of the Phone Application and the Information Application are configured to facilitate use by the user without prior familiarity with each application.

3. The method of claim 1, wherein the Phone Application is configured to provide telephony functions of the walk-up telecommunications terminal.

4. The method of claim 3, wherein the Phone Application is configured to receive and/or send at least one telephone call.

5. The method of claim 3, wherein the Phone Application is configured to handle one call at a time such that when a call is in progress an additional call cannot be received or placed.

6. The method of claim 1, wherein the Phone Application is active when a call activity exists and/or when a handset of the walk-up telecommunications terminal is off-hook.

7. The method of claim 1, wherein the Phone Application is configured to take priority over a top line of the display screen when there is a call being placed or received.

8. The method of claim 1, wherein the Phone Application is configured to use the top line of the display when the Phone Application is active.

9. The method of claim 1, wherein the Information Application comprises an application other than the Phone Application.

10. The method of claim 9, wherein the Information Application comprises a web browser.

11. The method of claim 9, wherein the Information Application comprises at least one of the local application and a wireless markup language (WML) application.

12. The method of claim 11, wherein the local application comprises at least one of a main menu and a Contacts application.

13. The method of claim 1, wherein, when the Phone Application is active, the Phone Application and the Information Application are configured to display information on the display screen at a same time.

14. The method of claim 1, wherein the Information Application is configured to display information in the application area of the display screen when the Phone Application is active, and
    wherein the Information Application is configured to display information on the top line and the application area of the display screen when the Phone Application is not active.

15. The method of claim 1, wherein, when the Phone Application is not active, the Information Application is configured to display, in the top line of the display of the walk-up telecommunications terminal, prompts for prompting the user to perform a predetermined action.

16. The method of claim 1, wherein, when the Phone Application is not active, the Information Application is configured to display a title of an active application in a top line of the display screen and a content page of the Information Application in the application area.

17. The method of claim 1, further comprising:
    activating the Phone Application and initiating a telephone call in response to the user selecting a call item being displayed by the Information Application.

18. The method of claim 17, wherein, when the telephone call is placed in response to the selection of the call item, the Phone Application displays a label of the call item on a top line of the display screen.

19. The method of claim 1, wherein the Phone Application is configured to display a prompting message on the display screen for prompting the user to pick up a handset of the walk-up telecommunications terminal to be connected to an incoming telephone call.

20. The method of claim 19, wherein the Phone Application displays the prompting message in the top line of the display screen.

21. The method of claim 1, wherein the Idle Application is displayed on the display screen of the walk-up telecommunications terminal when an idle time exceeds an idle threshold, and
wherein the idle time is a time that the Phone Application and the Information Application are inactive.

22. The method of claim 21, wherein an idle splash screen is displayed as a default Idle Application.

23. The method of claim 22, wherein the idle splash screen comprises a wireless markup language based (WML-based) application and/or a branded Splash screen.

24. The method of claim 1, wherein the triggering event includes at least one of the user taking a handset of the walk-up telecommunications terminal off the hook, the user pressing a key of the walk-up telecommunications terminal, an incoming call, and a barge-in or HTTP push.

25. The method of claim 24, wherein a navigation path of the Information Application is reset when the Startup Screen is displayed.

26. The method of claim 1, wherein the Startup Screen displays a main menu, a Contacts application, a Directory application, and/or a browser application.

27. The method of claim 26, wherein, when the Startup Screen displays the main menu and when the main menu includes only one item, the walk-up communications terminal automatically launches the one item.

28. The method of claim 26, wherein the main menu comprises a connector item that links to the Contacts application, the Directory application, and/or the browser application.

29. The method of claim 1, wherein the Phone Application displays a prompt in the application area for requesting the user to pick up the handset when the communications terminal is on the hook and the user attempts to engage in an action that requires the phone to be off-hook, and
wherein, when the communications terminal is taken off the hook by the user, the action is engaged and the application area is returned to a previously displayed application.

30. The method of claim 1, wherein the Phone Application displays an error message to inform the user that a call is already in progress, and
wherein an attempt to launch another call is prevented.

31. The method of claim 1, wherein configuration and settings options of the walk-up telecommunications terminal are configured such that the configurations and settings options are not visible in the Phone Application and the Information Application and are triggered by a predetermined key sequence known by a system administrator.

32. The method of claim 1, wherein taking control of and changing at least a portion of the display screen comprises taking control of less than all of the display screen.

33. A non-transient computer-readable medium encoded with instructions that when executed by a computer perform a method of providing access to a Phone Application and an Information Application using a walk-up telecommunications terminal having an intuitive, context-sensitive interface configured to facilitate simple and intuitive usage by a user, the method comprising:
displaying an Idle Application on a display screen of the walk-up telecommunications terminal;
displaying a Startup Screen on the display screen of the walk-up telecommunications terminal in response to a triggering event;
activating the Phone Application in response to a Phone Application event;
activating the Information Application in response to an Information Application event,
wherein the Phone Application is configured to take priority over the Information Application in the user interaction with the walk-up telecommunications terminal by taking control of and changing at least a portion of the display screen displaying information relating to a local application other than the Phone Application.

34. The non-transient computer-readable medium of claim 33, wherein the Phone application is configured to take priority over the Information Application by taking control of and changing less than all of the display screen.

35. A method of providing information to a user of a walk-up telecommunications terminal and allowing the user to place a call to an intended destination, the method comprising:
displaying an Idle Application on a display screen of the walk-up telecommunications terminal when an idle time exceeds an idle threshold;
displaying a Startup Screen on the display screen of the walk-up telecommunications terminal in response to a triggering event;
activating a Phone Application in response to a Phone Application event; and
activating an Information Application in response to an Information Application event,
wherein the idle time is a time that the Phone Application and the Information Application are inactive,
wherein the triggering event includes a key of the walk-up telecommunications terminal being pressed, a handset of the walk-up telecommunications terminal being taken off-hook, an incoming call, and/or a barge-in or HTTP push,
wherein the Phone Application is configured to take priority over the Information Application in the user interaction with the walk-up telecommunications terminal by taking control of and changing at least a portion of the display screen displaying information relating to a local application other than the Phone Application.

36. The method of claim 35, wherein when the triggering event includes an incoming call, the method further comprises:
displaying a prompting message on the display screen for prompting the user to pick up a handset of the walk-up telecommunications terminal to be connected to the incoming call.

37. The method of claim 35, wherein when the triggering event includes the handset of the walk-up telecommunications terminal being taken off-hook, the method further comprises:
activating the Phone Application and initiating a telephone call in response to the user entering a phone number or selecting a call item being displayed by the Information Application.

38. The method of claim 35, wherein when the user enters a phone number or selects a call item being displayed by the Information Application and the handset of the walk-up telecommunications terminal is on-hook, the method further comprises:

displaying a prompting message on the display screen for prompting the user to pick up a handset of the walk-up telecommunications terminal to initiate the outgoing call.

39. The method of claim 35, wherein, when the Phone Application is active, the Phone Application and the Information Application are configured to display information on the display screen at a same time.

40. The method of claim 35, wherein the Phone application is configured to take priority over the Information Application by taking control of and changing less than all of the display screen.

* * * * *